United States Patent
Fry et al.

(10) Patent No.: US 7,875,180 B2
(45) Date of Patent: Jan. 25, 2011

(54) WATER TREATMENT APPARATUS AND METHOD

(75) Inventors: John Fry, Torfaen (GB); Gerald Jones, Nr Swindon (GB)

(73) Assignee: University College Cardiff Consultants Ltd, Cardiff (GB)

( * ) Notice: Subject to any disclaimer, the term of this patent is extended or adjusted under 35 U.S.C. 154(b) by 661 days.

(21) Appl. No.: 11/547,693

(22) PCT Filed: Apr. 7, 2005

(86) PCT No.: PCT/GB2005/001358
§ 371 (c)(1),
(2), (4) Date: Feb. 4, 2008

(87) PCT Pub. No.: WO2005/097688
PCT Pub. Date: Oct. 20, 2005

(65) Prior Publication Data
US 2008/0296220 A1 Dec. 4, 2008

(30) Foreign Application Priority Data
Apr. 7, 2004 (GB) ................... 0407922.4

(51) Int. Cl.
*C02F 3/00* (2006.01)
(52) U.S. Cl. .............. 210/614; 210/620; 210/175; 210/181
(58) Field of Classification Search ............. 210/614, 210/620, 175, 181
See application file for complete search history.

(56) References Cited

U.S. PATENT DOCUMENTS 5,308,491 A 5/1994 Hauck, Jr. et al.

FOREIGN PATENT DOCUMENTS

WO WO 2004/002904 A 1/2004

OTHER PUBLICATIONS

"Recommended Design Criteria for Flow Equalization," http://web.deu.edu.tr/atiksu/ana52/abdtre07.html, downloaded Sep. 15, 2010 (undated).*
Tang, S.L.: "Dual water supply in Hong Kong", Proceedings of the 26th WEDC Conference, 'Online! 2000, XP002331462, p. 364-366.
Panswad T et al:, "Impact of high chloride wastewater on an anaerobic/anoxic/aerobic process with and without inoculation of chloride acclimated seeds", Water Research, vol. 33, No. 5, Apr. 1999, pp. 1165-1172, XP004182742.
Intrasungkha N, et al: "Biological Nutrient Removal Efficiency in Treatment of Saline Wastewater", Water Science and Technology, vol. 30, No. 6, 1999, pp. 183-190, XP008048385.

* cited by examiner

*Primary Examiner*—Chester T Barry
(74) *Attorney, Agent, or Firm*—Banner & Witcoff, Ltd.

(57) ABSTRACT

An apparatus for the biological treatment of saltwater-based domestic wastewater, the apparatus having an inlet for the introduction of the saltwater-based domestic wastewater, an outlet for the removal of treated wastewater, means for monitoring the salinity level of the saltwater-based domestic wastewater entering or within the apparatus and means for controlling the salinity level of the saltwater-based domestic wastewater entering or within the apparatus such that fluctuations in the salinity level of the saltwater-based domestic wastewater are reduced and the biological treatment of the saltwater-based domestic wastewater is thereby maintained.

37 Claims, 20 Drawing Sheets

Freshwater Dosed

FIG 6

| Species | Week at 100% salt with high inflow load | | |
|---|---|---|---|
| | 6 | 7 | 8 |
| Aspidisca cicada | - | present | - |
| Aspidisca costata | 13,000 | 2,200 | - |
| Carchesium polypinum | - | - | - |
| Chilodonella unicinata | 270 | 120 | 340 |
| Epistylis chrysemydis | present | 810 | present |
| Euplotes affinis | - | 1,500 | 1,800 |
| Litonotus lamella | - | present | - |
| Litonotus fasciola | present | present | 53,000 |
| Opercularia minima | - | - | 120 |
| Oxytrichidae | present | - | present |
| Spathium sp. | - | present | 250 |
| Trochilia minuta | - | present | - |
| Trachelophylum pusillum | 2,600 | 2,500 | 180 |
| Uronema nigricans | present | present | - |
| Vorticella aquadulcis | 3,600 | 42,000 | present |
| Vorticella convallaria | 1,700 | 2,200 | 3,200 |
| Vorticella camanula | - | present | - |
| Vorticella striata | - | - | present |
| Paramecium sp. | present | present | present |

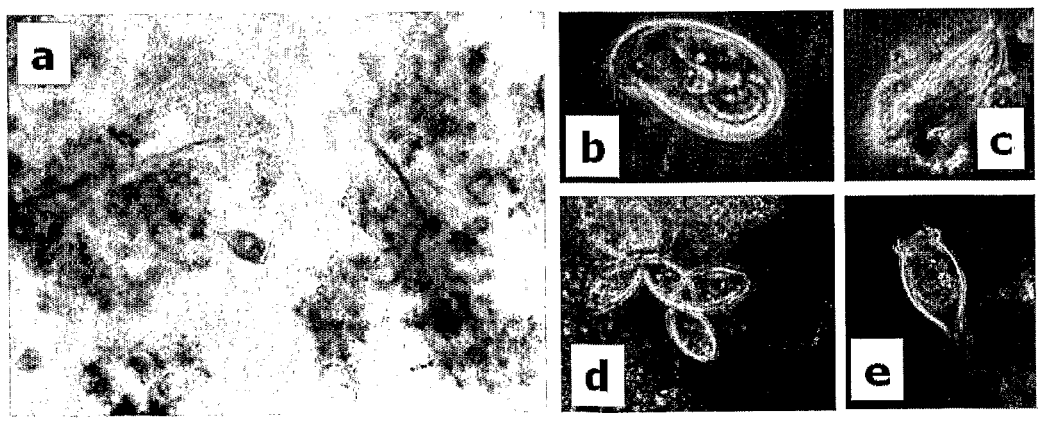

Freshwater Separate

Mixer System (a)

(b)

(c)

Summary statistics for period (mean; mg/l)

|  | BOD |
|---|---|
| Influent | 158 |
| Effluent | 13 |
| UK standard | 20 |
| European standard | 40 |

FIG 15

| BOD Loading | Reactor Type | BOD | | SS | |
|---|---|---|---|---|---|
| | | Influent | Effluent | Influent | Effluent |
| Low | RBC | 108 | 8 | 84 | 19 |
| | SABR | 108 | 6 | 84 | 18 |
| | SBR | 108 | 18 | 84 | 34 |
| | | | | | |
| UK standard | | | 20 | | 30 |
| European Standard | | | 40 | | none |

WATER TREATMENT APPARATUS AND METHOD

This invention relates to water treatment. In particular, this invention relates to methods and apparatus for the biological treatment of domestic wastewater based on saltwater.

In the field of wastewater treatment, it is common for domestic wastewater from toilet flushing to be treated by a biological process employing bacteria, protozoa and/or grazing invertebrates (e.g. see Bitton (1999) Wastewater Microbiology. Wiley-Liss, New York). Such biological processes are often preceded by physical treatment steps. The physical processes involve the removal of large organic and mineral particulate materials (e.g. screening, grit removal), sometimes followed by maceration to reduce the physical size of the organic particles. However, these steps are rarely used in small scale plants. The next step is usually sedimentation which removes the larger organic particles. These processes together are called primary treatment. The next step is then biological, or secondary, treatment. This is nearly always a predominantly aerobic process in which the sewage or wastewater is brought into intimate contact with a community of bacteria, protozoa and/or invertebrates so that these organisms can, in a variety of ways, interact together such that most of the organic matter is converted to carbon dioxide. Often, the ammonia and organic nitrogen present in the settled sewage is oxidised to nitrate or nitrogen gas. The precise arrangements of the biological process methodology used are organised so that production of microbial biomass is minimised. However, a final settlement phase is nearly always required to produce high quality effluent which conforms to national or international standards.

Regardless of which steps are carried out, however, it is the case that, since in most countries potable water, or freshwater, is used for toilet flushing, the physical and/or chemical and biological processes are conducted in a freshwater medium. Freshwater-based biological treatment systems require the establishment of relatively stable biological communities. These biological communities are capable of adapting to changes in the wastewater, e.g. changes in biological oxygen demand (BOD) as between high and low concentration effluents, but additional provisions are often made in order to maintain biological stability, e.g. the use of storage tanks to intercept large amounts of storm water which would be capable of causing a 'dilution shock' to the biological treatment apparatus. Using potable water for both toilet flushing and other domestic purposes can be regarded as a waste of a resource which, in some parts of the world, is particularly scarce. For this reason, it is known to use seawater, rather than potable water, for toilet flushing in developed hot countries with little rainfall (e.g. Malta, Hong Kong). In such countries, it is common for the domestic water supply to comprise a 'dual pipe' system. One 'pipe' provides sea water for toilet flushing, the other 'pipe' provides potable water For drinking and washing purposes. The majority of systems employing a 'dual pipe' approach do not involve wastewater treatment. The purpose of the seawater pipe is to conserve freshwater and the toilet effluent and drinking/washing effluent streams are generally released untreated into the environment. The effluent from toilet flushing (known in the art as 'brown water') and the effluent from washing etc. (known in the art as 'grey water') is, in traditional wastewater systems as well as a few of those employing the 'dual pipe system', mixed and treated in an apparatus or plant designed for the treatment of freshwater. Alternative or additional approaches for the conservation of potable water include 'grey water recycling', where water used for washing is treated locally and then used for toilet flushing or for irrigation. In each of these cases, however, the eventual brown water is still based on a freshwater source and is thus treated using a freshwater-based biological approach.

Biological and/or chemical treatment methodologies for high salinity wastewaters have been described in a few industrial settings, e.g. effluents from fish washeries and tanneries (see, for example, EP0523883). However, these methodologies do not address the fact that, in the domestic setting, at least one stream of wastewater must be based on freshwater, even if a saltwater stream is used for toilet flushing. Consequently, the control of the salinity levels in treatment methods using saltwater wastewaters has not beers addressed, the effluent in the industrial settings mentioned above not being subject to the same potential variations in salinity as a domestic brown-water stream based on saltwater and to which is added, in the prior art dual-pipe methods, a grey-water stream based on freshwater.

The biological treatment of domestic wastewater based on saltwater has beer addressed. Most of the methods described employ 'non-classical' biological treatments, e.g. using algae or other plants. In EP0523883, algae (and, optionally, cyanobacteria) are used to treat tannery effluent or organic sewage effluent in a saline medium. However, the process described relates to partially-treated freshwater sewage made saline by the subsequent addition of saltwater. The use of other salt-tolerant plants is described in Brown et al. (1999) *Aquaculture* 175, 255, wherein nutrient removal from saline aquaculture wastewater is demonstrated. In U.S. Pat. No. 4,442,007, a wastewater treatment system designed for use in tidal coastal areas is disclosed. The system consists of a freshwater supply network for the provision of potable water and a separate supply network for the provision of a solution of hydrogen peroxide in seawater for toilet flushing. Following use, both the freshwater- and seawater-based wastewaters are conducted to the same treatment location where they are mixed to produce a single output effluent for treatment by means of microorganisms naturally present in the seawater. No attempt is made to control the salinity of the wastewater being treated. In addition, the hydrogen peroxide is a highly reactive chemical additive which confers significant operational and environmental disadvantages. A wastewater treatment plant for biological treatment of seawater-based brown-water is also employed at the New Zealand Scott Base in Antarctica. However, the brown-water is mixed with a freshwater-based grey-water stream in an uncontrolled manner, resulting in salinity levels in the treatment mixture which are relatively low compared to seawater and which can vary by up to 100% of the average value in each direction. Such uncontrolled and random variation in salinity has not, however, hitherto been appreciated as a potential problem in the operation of the plant.

In JP5208197A, sea water is added to a freshwater-based activated sludge process in order to reduce bulking of sludge and promote sedimentation. In EP0104648A2, a process for the biological treatment of industrial wastewaters is described in which the wastewater is adjusted to predetermined levels of pH and salt concentration prior to mixing with a sludge of pre-acclimated microorganisms. GB1466530 describes a freshwater-based wastewater treatment process, particularly aimed at the treatment of oil-contaminated industrial wastewaters, wherein sea water is fed to the wastewater during the treatment. The effects of the seawater on an activated sludge process are ascribed to chemical properties of the various salts present, e.g. increased sedimentation of sludge and provision of trace nutrients to microorganisms growing in the freshwater-based culture medium. A range of low salt concentrations (typically 0.4 wt. % or below) are used and no monitoring of salt concentration is employed.

As illustrated above, therefore, there has been no recognition in the prior art of the importance of controlling the salinity level of wastewater based on saltwater. It is an object of the present invention to improve on this prior art position.

Accordingly, one aspect of the present invention provides apparatus for the biological treatment of saltwater-based domestic wastewater, the apparatus having an inlet for the introduction of the saltwater-based domestic wastewater, an outlet for the removal of treated wastewater, means for monitoring the salinity level of the saltwater-based domestic wastewater entering or within the apparatus and means for controlling the salinity level of the saltwater-based domestic wastewater entering or within the apparatus such that fluctuations in the salinity level of the saltwater-based domestic wastewater are reduced and the biological treatment of the saltwater-based domestic wastewater is thereby maintained.

The apparatus of the present invention allows the establishment of a relatively halophilic biological community and, importantly, allows the maintenance of the community in a state close to an equilibrium, regardless of the salinity level of the effluent or saltwater introduced into the apparatus. The efficiency of biological treatment of the wastewater is thus improved and the apparatus allows the realisation of the economic and environmental benefits from the use of saltwater for applications such as toilet flushing. The inclusion of a monitoring device allows an accurate determination of the type and extent of remedial action required to maintain the salinity of the contents of the apparatus. The device may measure the conductivity of the wastewater or treated wastewater, or the dry weight of dissolved solids. A preferred conductivity measurement device is a torroidal conductivity probe. The term 'domestic' as used herein implies wastewater arising from human personal activities, i.e. excretion, washing, clothes washing etc., as distinct from wastewater arising from industrial processes. The invention is not limited to the treatment of wastewater coming from houses, but also includes that from hotels, offices, hospitals and the like. The term "saltwater-based" as used herein refers to a domestic wastewater treatment process in which saltwater from seawater, saltwater groundwater, brines at seawater strength or below, and other saltwater sources not derived directly from seawater, are used as a carrier medium in domestic situations for various waste materials such as faeces, urine, kitchen waste and the like. The predominant salt present in the saltwater is NaCl.

The means for controlling the salinity level of the saltwater-based domestic wastewater within the apparatus is preferably capable of reducing fluctuations in salinity level to within 50%, more preferably 25%, most preferably 10%, of the desired salinity level.

The apparatus may work on the principle of, for example, a submerged, aerated biofilm reactor (SABR), an activated sludge reactor (AS), a sequencing batch reactor (SBR), a rotating biological contactor (RBC) or a membrane bioreactor (MBR), such as a submerged membrane bioreactor. In the SABR, the apparatus comprises a tank for receiving the wastewater and a number of solid, generally plastics material, bodies (e.g. tubes) on which are grown the microorganisms capable of treating the wastewater. The wastewater in the tank is aerated using, e.g. oxygen gas or air. In the AS, wastewater is aerated and then the activated sludge flocs, containing most of the biomass, are separated from the treated wastewater in a settling tank. A high proportion of the sludge flocs is then returned back into the aeration chamber so that a high microbial biomass is maintained. In the SBR, the principles of an activated sludge plant are established by temporally separating the aeration and settlement phases. This is done by allowing the growth of the biological community in aerated wastewater in a tank followed by sedimentation of the organisms, in the same tank. The tank is then emptied of the treated component of the wastewater, whilst the microbial flocs are retained, and the process is repeated with further wastewater such that batches of treated wastewater are produced. In the RBC, organisms are grown on one or more large, typically circular, plates mounted above a tank of wastewater with their radial axes substantially perpendicular to the surface of the wastewater, the plates being partially submerged in the wastewater. In use, the plates are rotated about an axis substantially parallel to the surface of the wastewater such that given areas of the surface of the plates are alternatively submerged in and then drawn clear of the wastewater. When a given area of the surface of a plate is submerged, biological treatment of the wastewater in contact with that area takes place. When that area is drawn clear of the wastewater, aeration of the biological and wastewater material adhering to that area takes place. A MBR is a hybrid process/apparatus which combines biological wastewater treatment with synthetic membrane filters submerged in wastewater. The membrane filters may have various configurations including flat sheet or hollow fibres. Such a reactor is described in EP1341597 and JP11253942.

The means for controlling the salinity level of the saltwater-based domestic wastewater within the apparatus may comprise a supplementary saltwater feed, by which the contents of the apparatus may be maintained at a substantially constant overall volume. When biological treatment is to take place at a salinity level less than that of the saltwater upon which the saltwater wastewater is based, a freshwater or dilute saline solution feed may be provided for this purpose.

The supplementary saltwater feed, typically originating from the same source as the saltwater used as the basis of the wastewater, tends to restore the salinity of the contents of the apparatus towards that of the saltwater used as the basis of the wastewater, thus helping to maintain equilibrium conditions for the biological community. The maintenance of a substantially constant overall volume further helps in this regard. The saltwater feed also has the advantage that peaks of biological oxygen demand in the wastewater may be smoothed out in order to optimise biological treatment efficiency.

The apparatus may have a further inlet for the introduction of domestic wastewater based on freshwater and a component for the mixing of the freshwater-based wastewater and/or the saltwater-based wastewater with salt (i.e. NaCl), saltwater, a concentrated saline solution, a dilute saline solution and/or freshwater, prior to or on introduction of the freshwater-based wastewater.

The provision of the further inlet allows the apparatus to be used for the treatment of wastewaters arising from a dual-pipe plumbing assembly, in which the sewage pipework is also dual-pipe, i.e. in which the freshwater wastewater and the saltwater wastewater are conducted separately to treatment or recycling. The freshwater wastewater would lower the salinity of the saltwater wastewater in a relatively uncontrolled manner, thus resulting in a loss of equilibrium in the biological community and a reduction in treatment efficiency. Accordingly, the addition of salt, saltwater or concentrated saline to the freshwater wastewater minimises the impact of the freshwater wastewater on the salinity level of the contents of the apparatus and thus attenuates the loss of treatment efficiency. Equally, in processes in which a salt concentration is used which is lower than that of the saltwater used as the basis of the saltwater-wastewater (e.g. where a 50% or 25% saltwater process is desired), dilute saline solution or freshwater may be added to the saltwater-based wastewater in order to lower the salinity level thereof to the desired level. It will be clear that the salt, concentrated or dilute saline solution, saltwater or freshwater may be added either to the saltwater-based wastewater or the freshwater-based wastewater, or both, provided that the desired salinity level is achieved in the resulting mixed wastewater for biological treatment. In preferred embodiments, it will be more desirable to add salt, concentrated saline or saltwater so as to avoid excessive usage of freshwater. For the avoidance of doubt, the term 'concentrated saline solution' refers to a solution with a higher salt concentration than the saltwater used as the basis for the saltwater-wastewater. 'Dilute saline solution' should be construed accordingly. The component for the mixing of the freshwater or saltwater wastewater with salt, saltwater, dilute or concentrated saline solution or freshwater may comprise a stirring device or mixing chamber upstream of the further inlet, or may simply comprise an outlet for the addition of the saltwater etc. to the freshwater wastewater on its passage towards or through the further inlet, mixing occurring by virtue of the flow of the freshwater wastewater and/or the turbulence created therein on its introduction into the apparatus.

It is also preferable that the means for controlling the salinity level of the wastewater comprises a device for the supply of saltwater, salt or concentrated saline solution. The use of salt or a concentrated saline solution reduces the volume of liquid required to be added for salinity level maintenance and thus confers advantages in terms of storage and pumping requirements. The apparatus may also or alternatively include a device for the supply of dilute saline solution or freshwater in order to allow for the reduction of the salinity level of the contents of the apparatus, either because of an overdosing of e.g. concentrated saline solution or because of more gradual increases in salinity, e.g. due to evaporation of water from the apparatus, or because a reduced salinity level process is desired.

The apparatus may include an evaporator for the production of the salt or concentrated saline solution from saltwater originating, preferably, from the same source as that on which the saltwater-based domestic wastewater is based. The evaporator may be solar powered. Production of the salt or concentrated saline solution at the site of the apparatus confers benefits in terms of storage and transportation whereas the use of solar power has the advantage of reducing the energy usage of the apparatus, as well as being environmentally advantageous.

The apparatus is preferably constructed such that those parts which came into contact with saltwater-based domestic wastewater during normal use are formed from salt and/or water corrosion resistant materials. Such materials may be, for example, stainless steel or plastics.

Preferably, the saltwater is sea water. Sea water is naturally extremely abundant and therefore allows significant savings to be made in terms of reduced use and subsequent need for treatment of freshwater.

The apparatus is preferably provided with a marine biological culture, capable of giving rise to a marine biological community. The term 'marine biological community' is herein defined as a suspended or attached community of bacteria and other microorganisms that develops, without acclimation or addition of salts to provide chemical benefits for the microorganisms, when saltwater-based wastewater is held and aerated in a biological wastewater treatment facility. Such a community develops directly from a marine biological culture, which may be based on the microbes in seawater, the microbial communities in source saltwater or might be added as microbes previously grown in other saltwater-based treatment facilities.

In another aspect, the present invention provides a domestic water supply and sewerage assembly comprising: a first supply conduit for the supply of saltwater to at least one toilet and a corresponding first sewerage conduit for removal of saltwater-based wastewater from the toilet; and a second supply conduit for the supply of freshwater to one or more devices requiring potable water and a corresponding second sewerage conduit for removal of freshwater-based wastewater from those devices, the first and second sewerage conduits being arranged so as to allow the transfer of the saltwater-based wastewater for biological treatment without the salinity level of the saltwater-based wastewater being affected by uncontrolled mixing with the freshwater-based wastewater to such a degree as to significantly affect the biological treatment.

The water supply and sewerage assembly of the present invention employs the dual pipe approach described above but ensures that, unlike in the prior art approaches, the saltwater and freshwater wastewaters do not become uncontrollably mixed in such a way as to significantly affect the salinity level-dependent biological treatment. Instead, mixing of the saltwater and freshwater wastewaters is either avoided prior to biological treatment or is controlled so as to regulate the salinity level of the resulting mixed wastewater and thus to preserve the equilibrium of the biological community in the facility to be used for biological treatment.

The first sewerage conduit may be arranged for the transfer of the saltwater-based domestic wastewater to an apparatus as described above. The second sewerage conduit may be arranged so as to allow the transfer of the freshwater-based domestic wastewater to a separate location to that of the treatment of the saltwater-based domestic wastewater. The freshwater-based wastewater may be biologically treated or may be recycled or used for irrigation.

In an alternative embodiment, the second sewerage conduit is arranged so as to allow the transfer of the freshwater-based wastewater to the same location as that of the treatment of the saltwater-based wastewater, the freshwater-based and saltwater-based wastewaters being mixed at or before reaching the location of biological treatment, and the first and/or second sewerage conduit, or a third common conduit carrying mixed wastewater, communicating, in use, with a supply of salt, saltwater, a concentrated saline solution, a dilute saline solution or freshwater, so as to increase or decrease the salinity of the resulting mixed wastewater.

If a freshwater wastewater stream is mixed with a saltwater wastewater stream, fluctuations in salinity will inevitably arise, with a resulting loss in biological treatment efficiency. In order to achieve improved biological performance, it is necessary to create relatively stable salinity levels and this is achieved by the assembly of the present invention, in preferred embodiments either through conveying the two streams to different locations or by increasing the salinity of the freshwater wastewater stream, e.g. prior to its addition to the saltwater wastewater. The assembly of the invention also has the advantage that it may be constructed from the dual pipe plumbing already in place. In preferred embodiments, the saltwater used in the assembly is seawater. Other saltwaters could also be used, however, such as estuarine water, saltwater groundwater, or brines at seawater strength or below.

In a further, related, aspect, the present invention provides a method for the biological treatment of domestic wastewater, the wastewater comprising a stream of saltwater-based domestic wastewater from at least one toilet supplied with saltwater, and a stream of freshwater-based domestic wastewater from at least one device supplied with freshwater, the method comprising transferring the stream of saltwater-based wastewater for biological treatment in such a manner as to avoid the salinity level of the saltwater-based wastewater being affected by uncontrolled mixing with the stream of freshwater-based wastewater to such a degree as to significantly affect the biological treatment, and biologically treating the resulting saltwater-based or mixed wastewater.

The method of the present invention allows the use of saltwater for toilet flushing in a dual pipe system but recognises the importance of control of the salinity level of the resulting wastewater and the need to regulate its contact with the freshwater stream. Such a method may be carried out using existing dual pipe plumbing, subject to appropriate modification of the wastewater pipes to avoid uncontrolled mixing of the freshwater and saltwater streams. The devices supplied with freshwater, typically potable water, may be, for example, showers, hand-basins, and the like, although it is recognised that it may occasionally be appropriate for such devices to also use saltwater (e.g. a basin for food washing).

In certain embodiments, the stream of saltwater-based wastewater is transferred, for biological treatment, to a separate location to the stream of freshwater-based wastewater. As described above, this approach allows one to avoid any freshwater contamination of the saltwater wastewater stream and thus provides for the establishment of a relatively stable saline environment for the biological treatment plant. In such embodiments, the freshwater-based wastewater may also be biologically treated, or may be recycled or used for irrigation.

Alternatively, the stream of freshwater-based wastewater is mixed with the stream of saltwater-based wastewater, salt, saltwater, a concentrated saline solution, a dilute saline solution or freshwater being added to the stream of freshwater-based wastewater and/or the stream of saltwater-based wastewater prior to or during the mixing, or being added to the mixed wastewater following mixing, so as to increase or decrease the salinity of the resulting mixed wastewater, prior to its biological treatment.

In preferred embodiments, the amount of salt, saltwater, concentrated saline solution, dilute saline solution or freshwater mixed with the freshwater-based wastewater and/or the saltwater-based wastewater, and the amount of the resulting mixture mixed with the saltwater-based wastewater or the freshwater-based wastewater, respectively, is such as to provide a salinity level in the resulting biological treatment mixture of 25 to 150% of the salinity level in the stream of saltwater-based wastewater. Using salinity levels close to that of the saltwater-based wastewater ensures that biological treatment efficiency can be maintained with minimal requirement for the dilution of the wastewater to be treated, such dilution being potentially wasteful of freshwater. Amongst other findings using the method of the invention, it has been found that it is possible to reduce biological oxygen demand and suspended solids levels satisfactorily in both high and low strength effluents using a 100% seawater-based medium and a 50% seawater-based medium and using both an AS and a SABR.

It is preferred that, during biological treatment of the saltwater-based wastewater, a supplementary feed of saltwater is provided to maintain the wastewater undergoing treatment at a substantially constant overall volume. The advantages of a supplementary saltwater feed are described above in relation to the apparatus of this invention.

Usefully, the salinity of the wastewater prior to, undergoing and/or following treatment is monitored. Whether salinity monitoring is carried out or not, it is advantageous to maintain the salinity of the wastewater undergoing treatment at a relatively constant level by means of the addition of salt or a concentrated saline solution to increase the salinity, or a dilute saline solution or freshwater to decrease the salinity, or further saltwater to alter the salinity towards the level of the saltwater-based wastewater. Such a step contributes to maintaining a relatively constant saline environment for the biological treatment plant.

The salt or concentrated saline solution may be obtained by the complete or partial evaporation of saltwater originating from the same source as that on which the saltwater-based wastewater is based. The evaporation step may be solar powered, as described above.

In preferred embodiments of the method, the saltwater is seawater.

The biological treatment may be aerobic biological treatment performed, for example, using a SABR, AS, SBR, MBR or a RBC. The treatment is typically performed using a marine biological culture based on bacteria, protozoa and/or invertebrates. The bacteria are preferably selected from single celled and filamentous heterotrophic bacteria and autotrophic nitrifying bacteria. The protozoa are preferably selected from grazing protozoa, predominantly ciliated stalked and crawling types. The invertebrates are preferably selected from grazing invertebrates, feeding on microorganisms and organic matter, predominantly meiofauna. The biological treatment preferably involves the additional step of the addition of nutrients in order to generate a biological community prior to the introduction of wastewater. The addition of nutrients ensures that the biological treatment plant is made ready for receiving wastewater in as short a time as possible. The nutrients may be in the form of a solution of organic materials, such as artificial sewage, or a viscous protein solution on a solid substrate. It is generally preferred that the generation of the biological community takes place at a salinity level substantially the same as that intended to be used for the biological treatment of the saltwater-based wastewater. This provision helps to avoid any 'shock' to the biological treatment community on the introduction of the wastewater and increases the efficiency of treatment since the organisms are pre-equilibrated to the salinity levels required for treatment.

In another related aspect, this invention provides a method for the biological treatment of saltwater-based domestic wastewater, the method comprising introducing the saltwater-based domestic wastewater into an apparatus suitable for the development and/or maintenance of a biological treatment community and controlling the salinity level of the wastewater within the apparatus such that fluctuations in salinity level are reduced and the biological treatment of the wastewater is thereby maintained.

In general, the use of seawater for toilet flushing (and, if appropriate, other non-drinking purposes) can save around 30% of normal freshwater usage. In terms of economic benefits, countries using seawater report financial savings of around 70% or more compared with the costs of producing and using freshwater, even when the costs of installation of dual pipe plumbing is taken into account. Given that approximately 70% of the world's population live within 50 km of the sea, the exploitation of seawater for toilet flushing could clearly have tremendous economic and environmental impact.

The present invention allows the realisation of the above economic and environmental benefits whilst recognising the problem that has hitherto not been identified in the art—the biological treatment of wastewater based on saltwater requires stability of salinity levels in order for optimal or near-optimal efficiency to be achieved. The prior art wastewater treatment methods generally involve uncontrolled contamination of the saltwater wastewater with freshwater, thus leading to random variation in the salinity levels of the medium in which the biological treatment takes place. The present invention, however, seeks to ensure that, even when the freshwater and saltwater streams are mixed, this is done in a controlled fashion with the use of buffering additions of salt and/or water and thus salinity stability is maintained.

The invention will now be described in more detail by way of example only and with reference to the appended drawings, of which:

Figure 2:
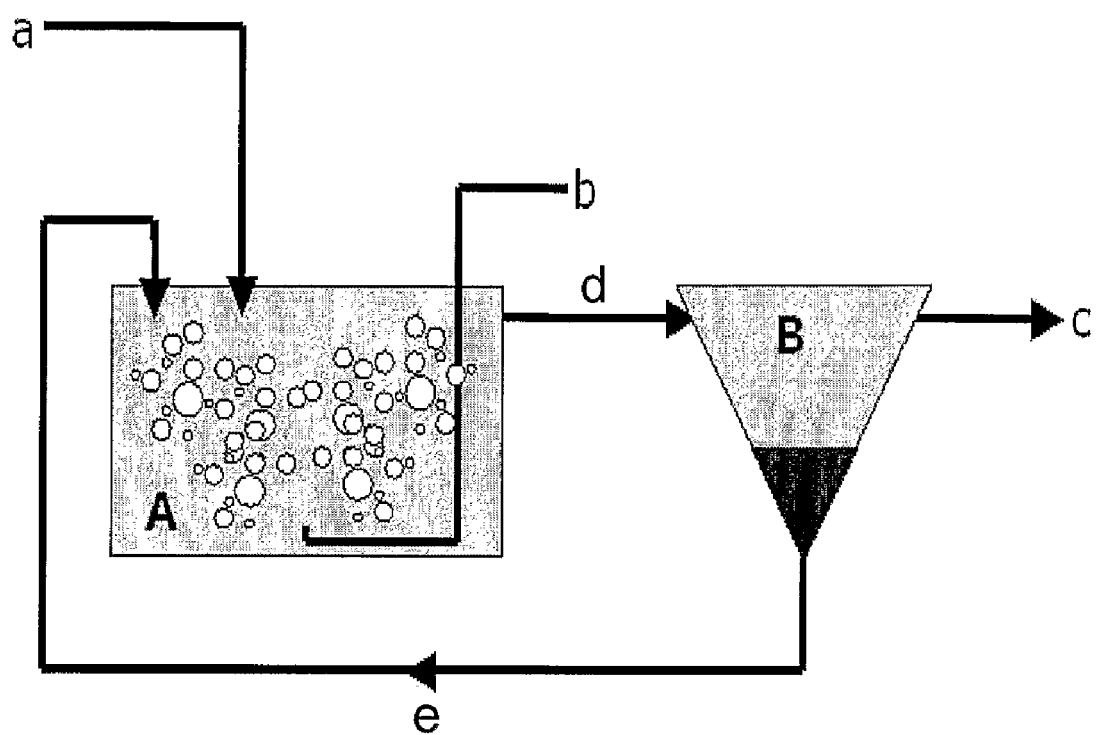
FIG. 2 shows a diagrammatic representation of a small-scale activated sludge reactor (AS) suitable for use according to the present invention.
Figure 3:
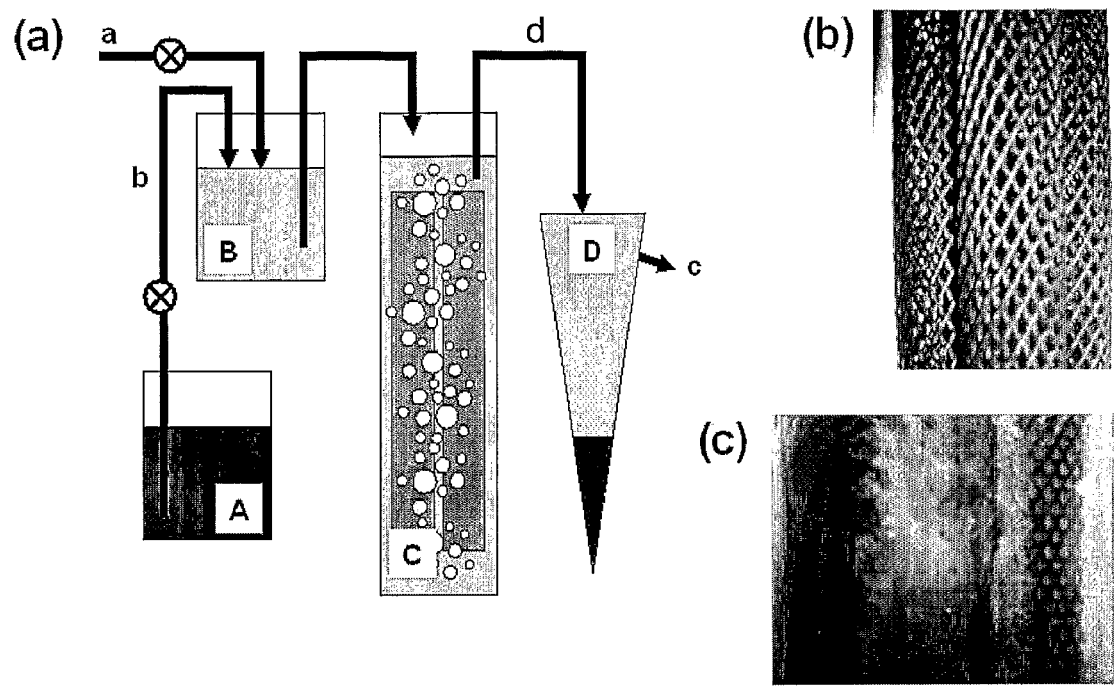
FIG. 3 shows (a) a diagrammatic representation of a small-scale SABR (b), an image of a substrate which can be used for supporting growth of the organisms in the SABR and (c) an image of the substrate of (b) with a developed biofilm coating.
Figure 4:
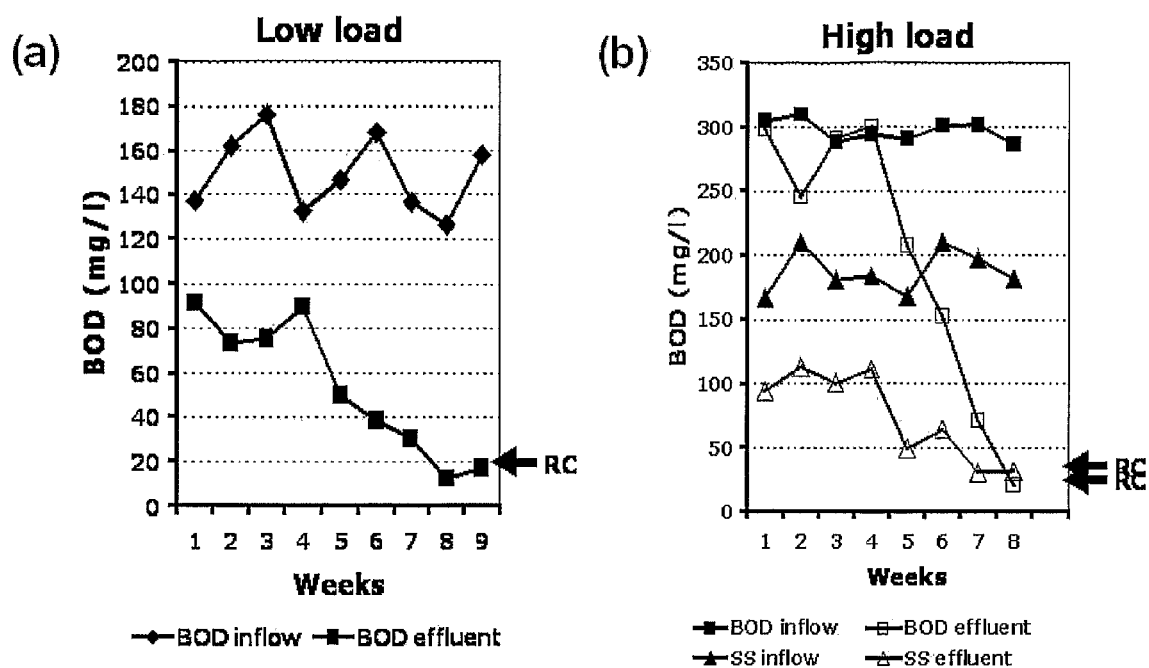
Figure 5:
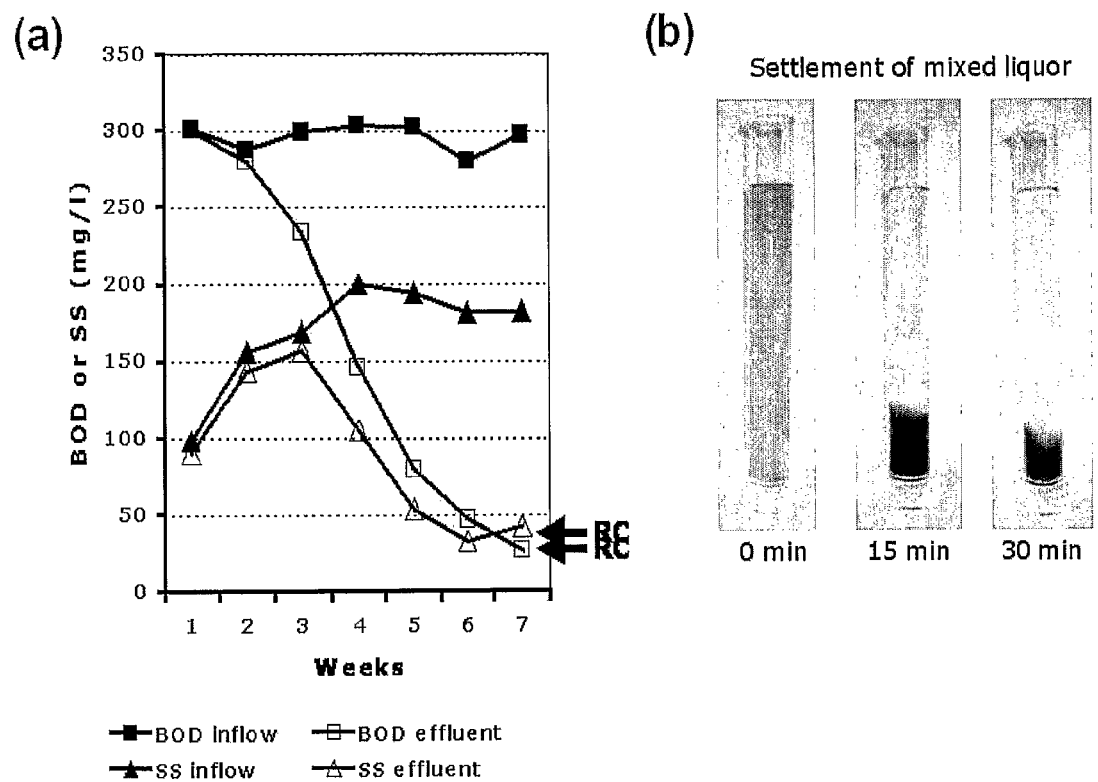
Figure 7:
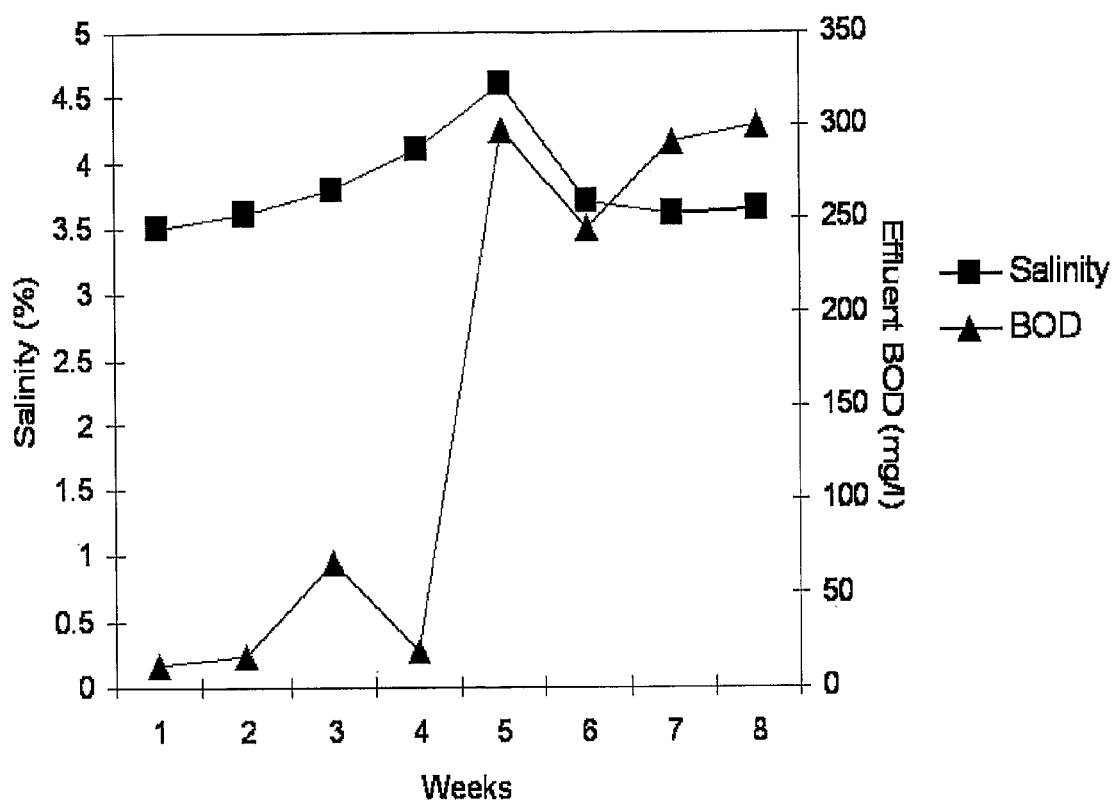
Figure 8:
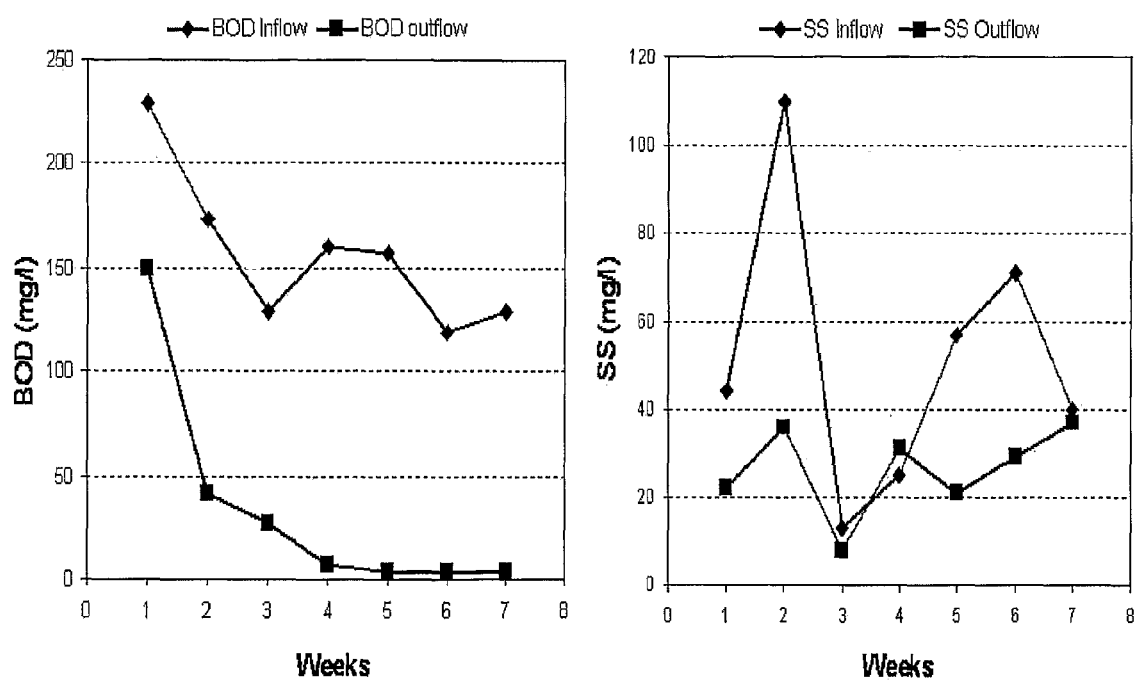
Figure 9:
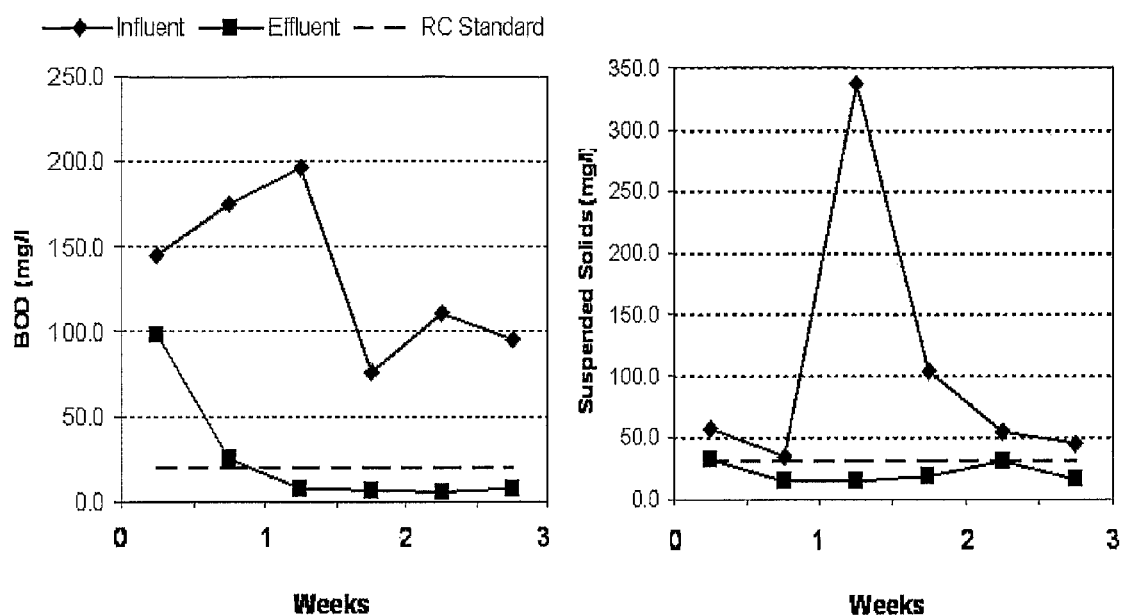
Figure 10:
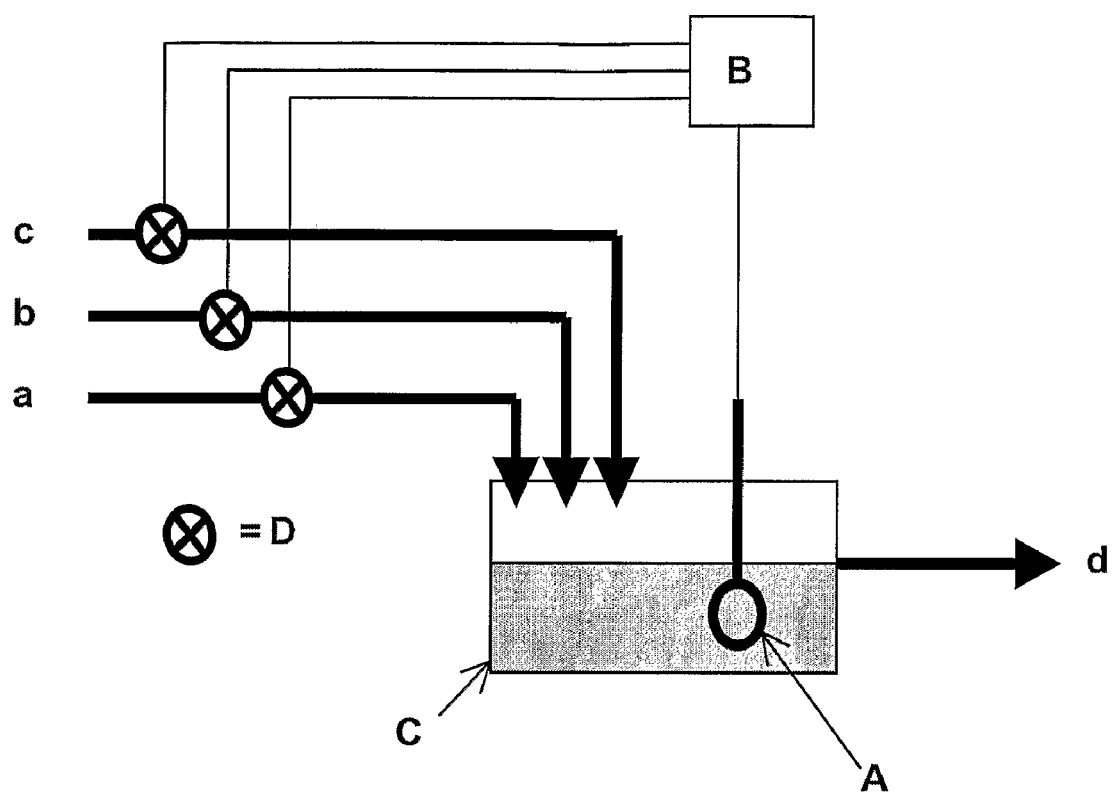
Figure 11A:
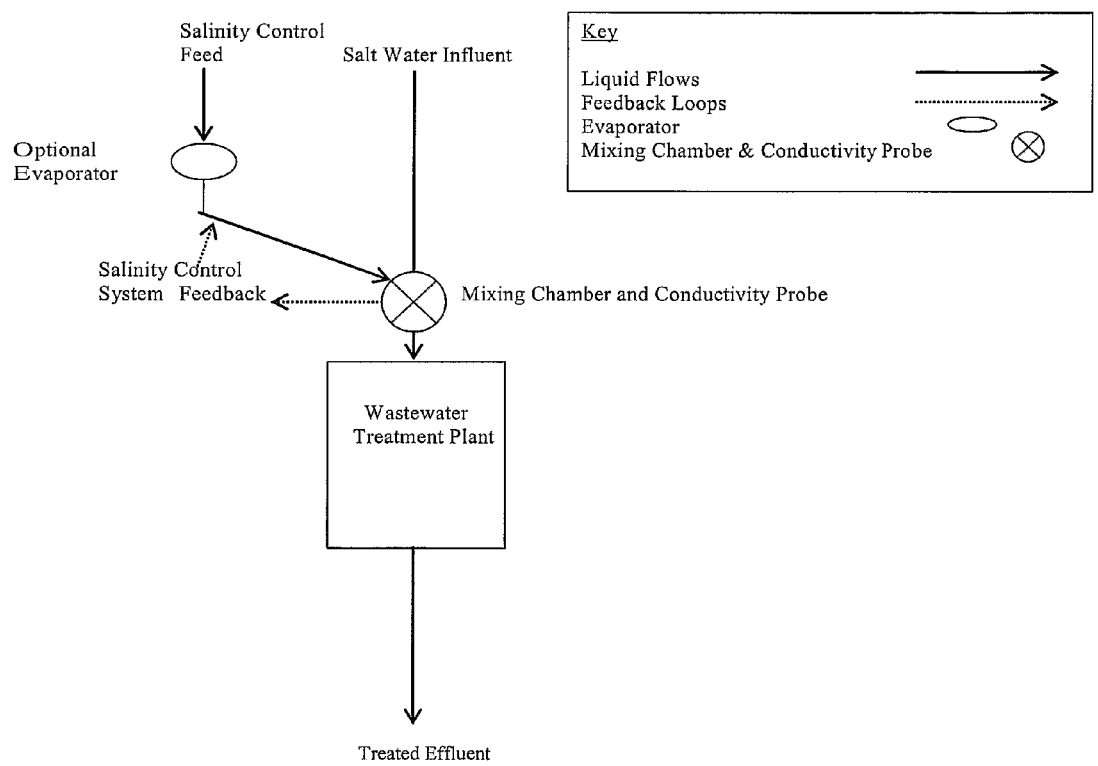
Figure 11B:
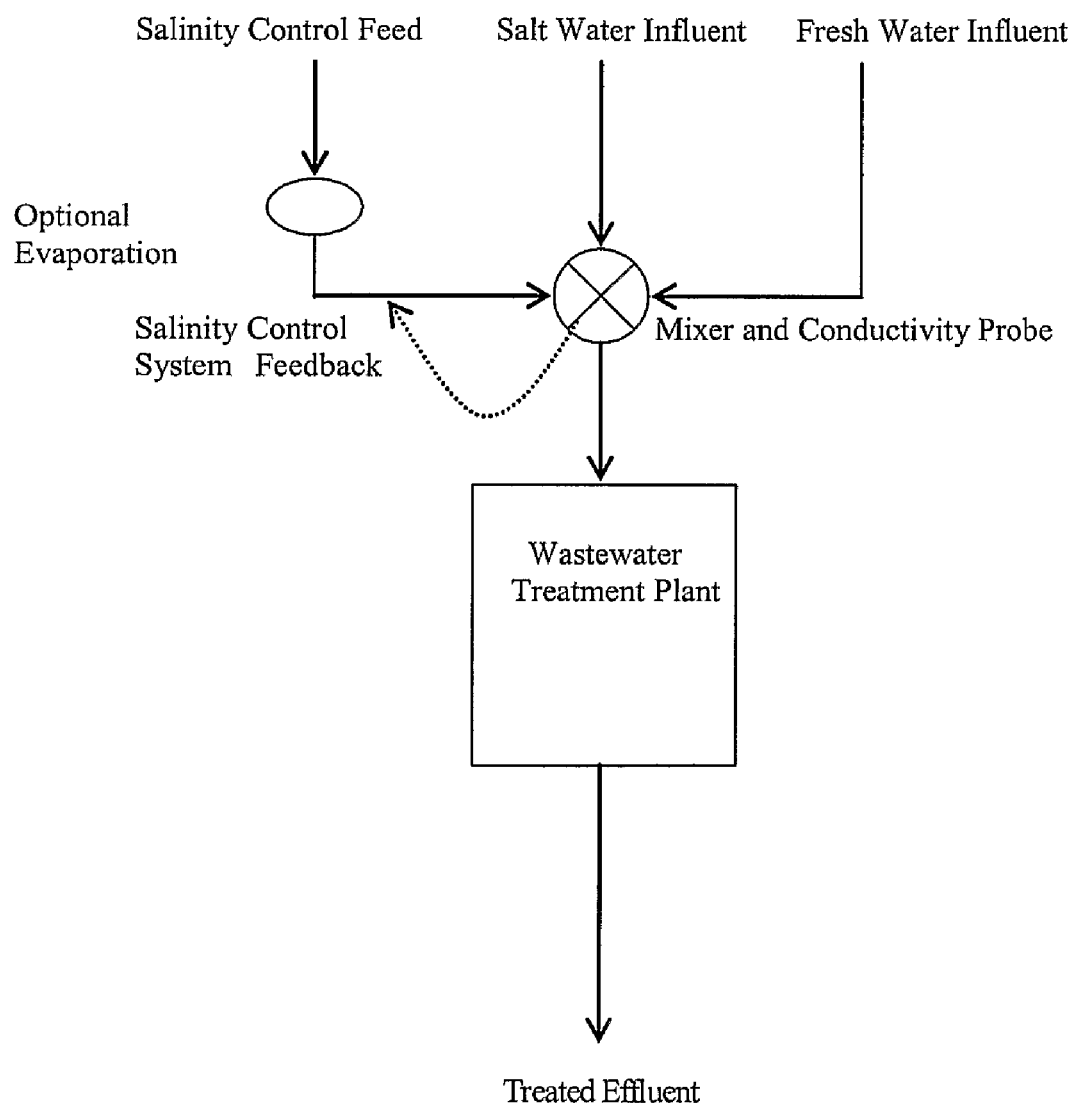
Figure 11C:
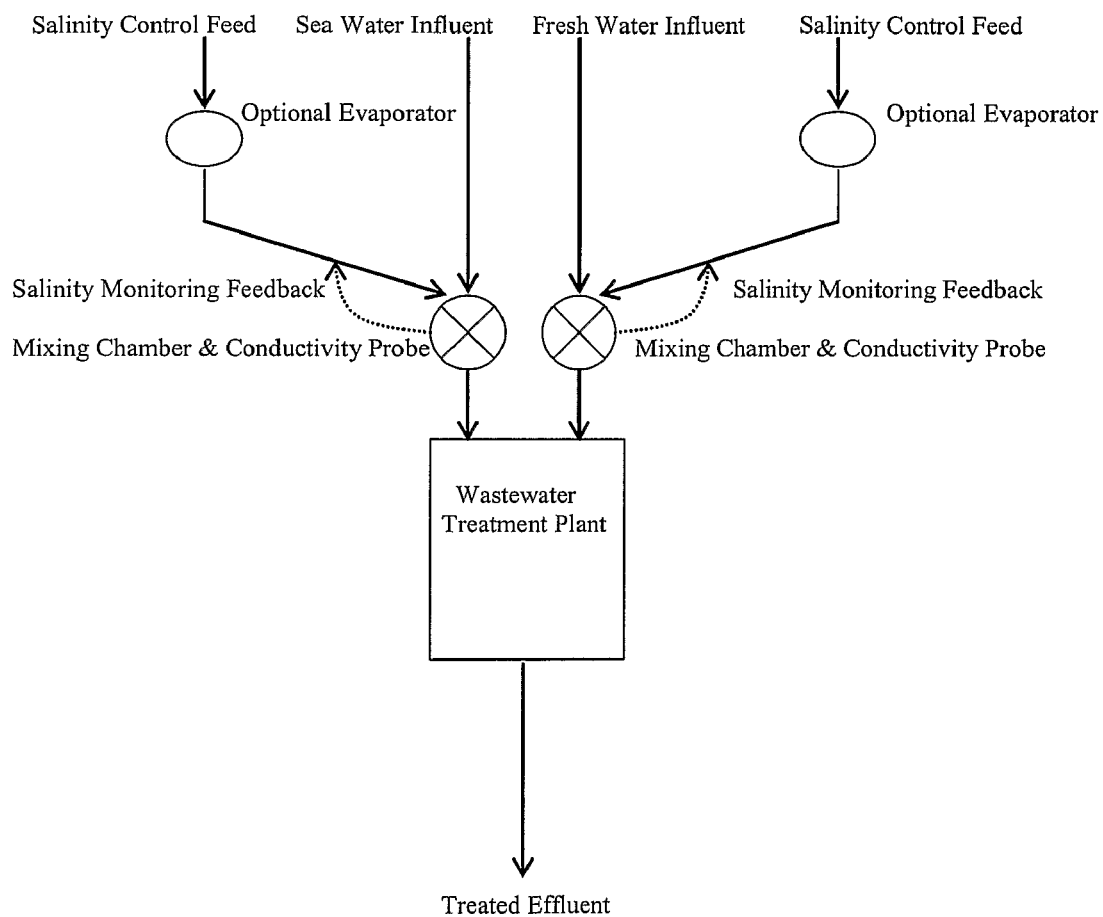
Figure 12:
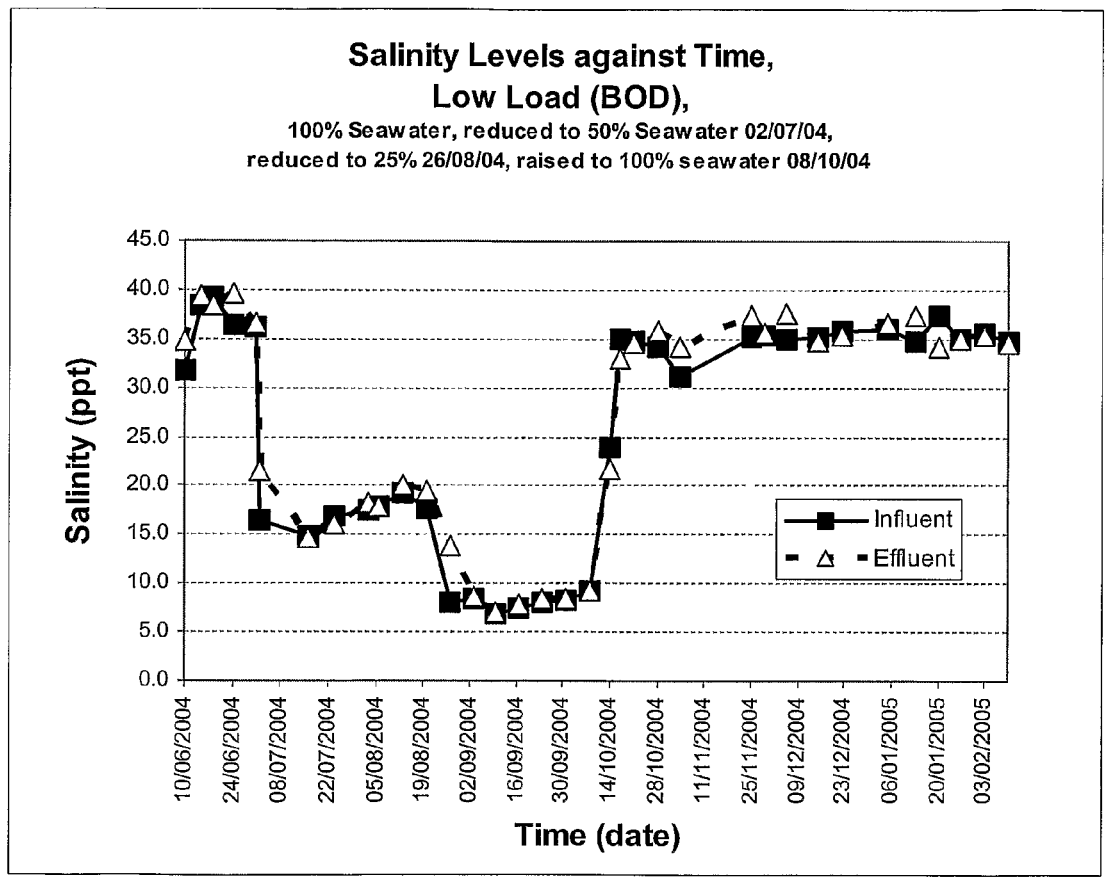
Figure 12:
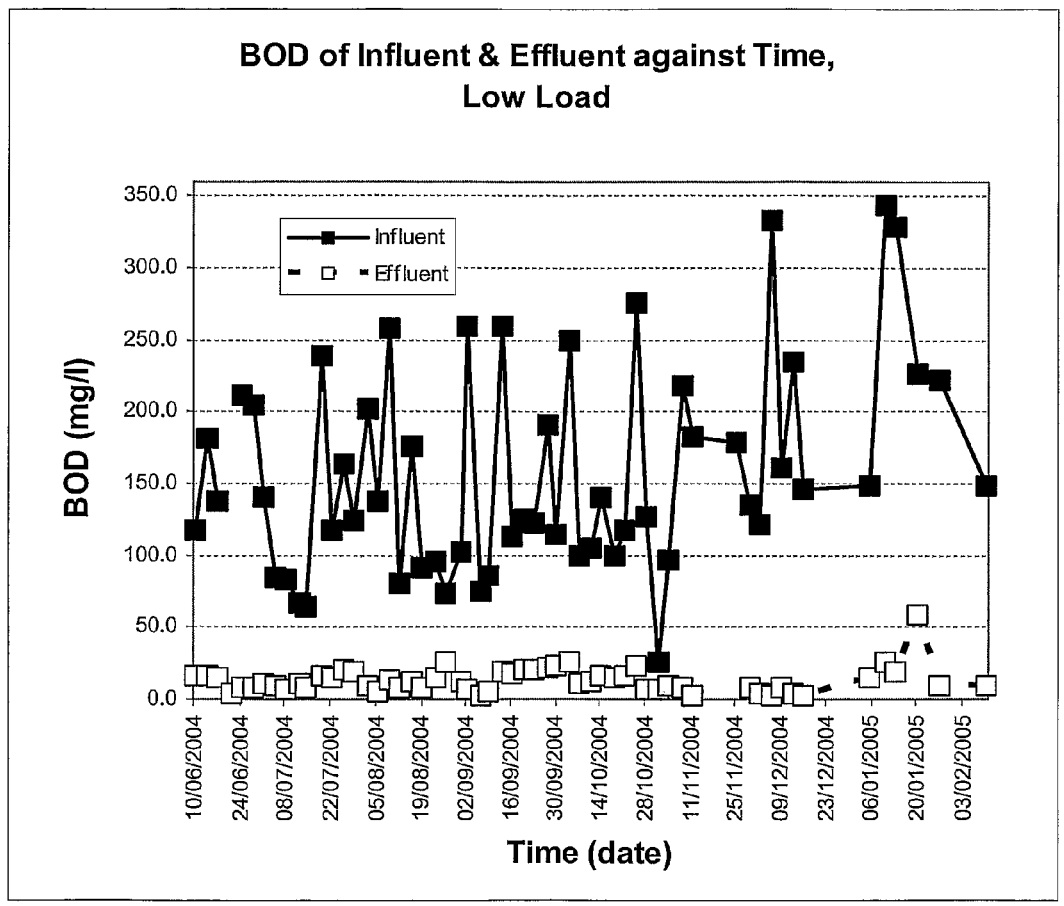
Figure 13:
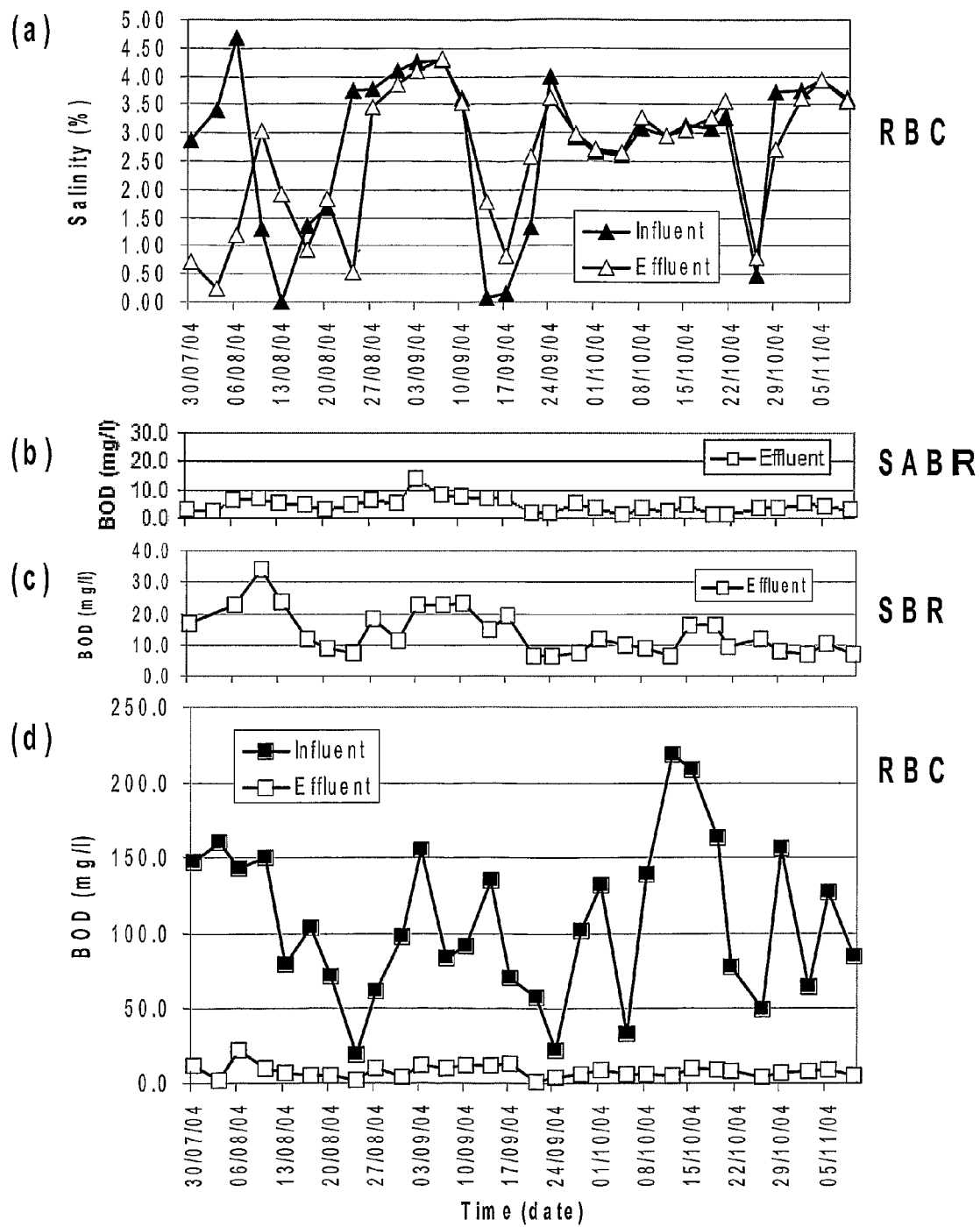
Figure 14:
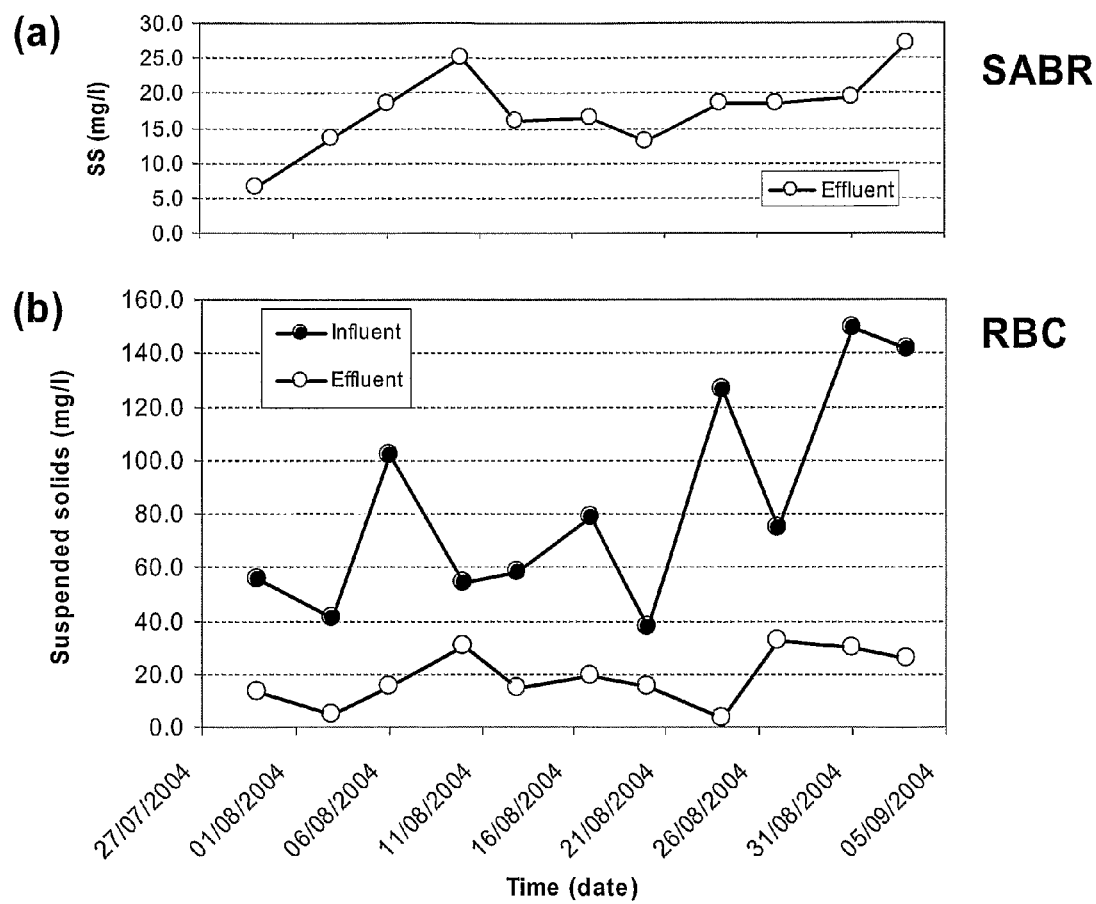
Figure 16:
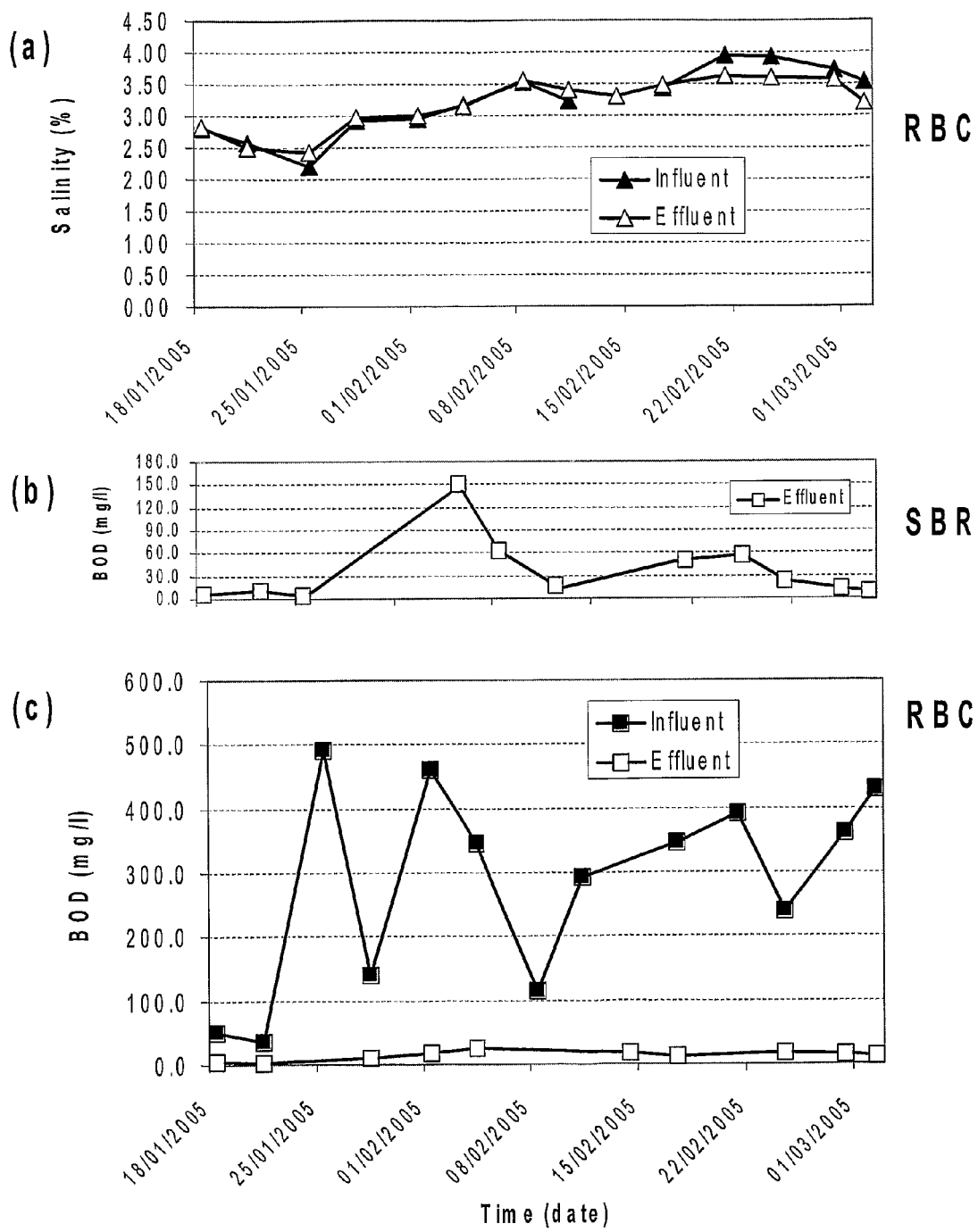
Figure 17:
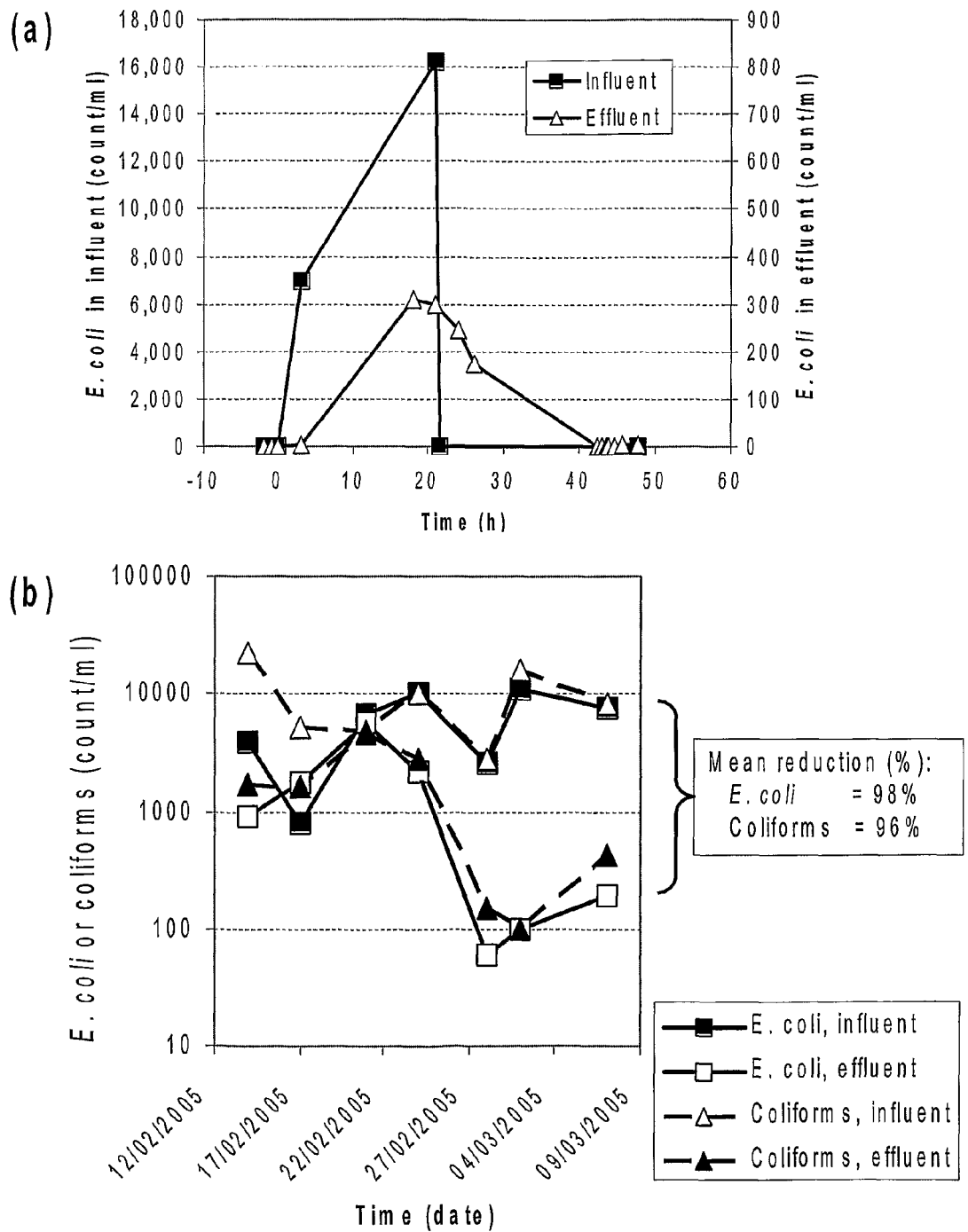

FIG. 4 shows the results of biological treatment of artificial sewage in the activated sludge reactor of FIG. 2 and using a 100% strength seawater base (salinity≈# 35 g/l). FIG. 4a shows the results using a low organic load and FIG. 4b a high organic load. RC=Royal Commission standards for BOD (lower arrow) and suspended solids (SS, upper arrow);

FIG. 5 shows (a) changes in the BOD and SS of artificial sewage treated in the reactor of FIG. 2 and using a 50% strength seawater base (salinity≈17.5 g/l) at high organic load, and (b) settlement of the mixed liquor suspended solids (MLSS, the solids in the aeration chamber) over time;

FIG. 6 shows the numbers of protozoa detected (Table), and a series of photomicrographs of a number of these protozoa, in the reactor of FIG. 2 during the experiment described in FIG. 5;

FIG. 7 illustrates the effect of a change in salinity on the BOD of the effluent from a reactor according to FIG. 2 during operation with artificial sewage with a 100% strength seawater base;

FIG. 8 shows the changes in (a) BOD and (b) SS during operation of a SABR reactor according to FIG. 3 immediately after set up, using artificial sewage with a 100% seawater base and low organic load (BOD≈150 mg/l);

FIG. 9 shows changes in (a) BOD and (b) SS during operation of a SABR reactor according to FIG. 3 after thorough cleaning (but not sterilisation), using artificial sewage with a 100% seawater base and low organic load (BOD≈150 mg/l);

FIG. 10 shows a schematic of a salinity control device suitable for use in a saltwater based wastewater treatment apparatus according to the invention;

FIG. 11 shows schematic diagrams of dual pipe wastewater treatment assemblies according to the invention. In (a), the freshwater-based wastewater is transferred to a separate location (e.g. for treatment, re-use or irrigation) to the saltwater wastewater, the latter being transferred for biological treatment; in (b), both saltwater and freshwater streams are transferred to a mixing zone prior to biological treatment of the mixed wastewater, a salinity control feed being provided at the mixing zone; in (c), each of the freshwater and saltwater streams has a salinity control feed which is added at a mixing zone, each saline-controlled intent stream then being transferred to the treatment plant;

FIG. 12 shows changes in salinity and BOD in the laboratory model SABR reactor over almost an 8 month period. (a) Variation of salinity, with (b) changes in influent and effluent BOD and (c) summary statistics for BOD (Note parts per thousand (ppt)=mg/l);

FIG. 13 shows salinity and BOD changes in three pilot plant wastewater treatment plants over a 15 week period at low BOD inflow. (a) Variation of overall influent salinity in the three pilot plants and effluent salinity in the RBC reactor, effluent BOD in the (b) SABR and (c) SBR reactors, and (d) overall influent BOD in the three pilot plants and effluent BOD in the RBC reactor;

FIG. 14 shows suspended solids (SS) changes in two pilot plant waste treatment plants over the first 5.5 week period shown in FIG. 13 at low BOD inflow. (a) Variation of SS in the effluent of the SABR reactor and in the (b) overall influent of the three pilot plants and the effluent of the RBC reactor;

FIG. 15 shows summary statistics for BOD and SS for the 5.5 week period shown in FIG. 14 at low BOD inflow;

FIG. 16 shows salinity and BOD changes for a 7 week period during a sudden change from low to high BOD inflow. Variation in (a) salinity in the overall influent to the three pilot plants and the effluent from the RBC reactor, (b) BOD in the effluent from the SBR reactor and (c) overall influent of the three pilot plants and effluent from the RBC plant; and FIG. 17 shows reduction in numbers of bacterial indicators of pathogens (*Escherichia coli* and coliform bacteria) in a laboratory scale SABR and a pilot plant SBR reactor. (a) Reduction in *E. coli* during a pulse-chase experiment in the laboratory scale SABR and (b) reduction in *E. coli* and coliforms after a sudden increase in influent BOD strength in the pilot plant SBR.

In the field of wastewater treatment, seawater is currently seen as a detrimental rather than as a beneficial resource. Wastewater treatment systems have been continuously developed since the nineteenth century and currently there are a plethora of such systems from which wastewater engineers can select a system appropriate to their needs. Despite this wide range of systems available they are generally based on freshwater sources. Wastewater treatment systems are largely assessed by measuring inflow and outflow concentrations of key chemical indicators or a treatment processes efficacy and the microbiology of the processes are rarely routinely monitored, despite being of vital importance to the treatment process. However, research carried out over many years by many investigators worldwide has led to a reasonable understanding of how microorganisms interact with their environment in these treatment facilities to improve effluent quality (e.g. Bitton (1999) Wastewater Microbiology. Wiley-Liss, New York). Similarly, microbiologists understand a great deal about the interactions between microbes and their environment in marine habitats (e.g. Kirchman (2000) Microbial Ecology of the Oceans. Wiley-Liss, New York). However, these two areas of knowledge have not been combined to produce saltwater-based waste treatment systems capable of maximising and optimising the efficiency of saltwater-based waste treatment.

Figure 1:
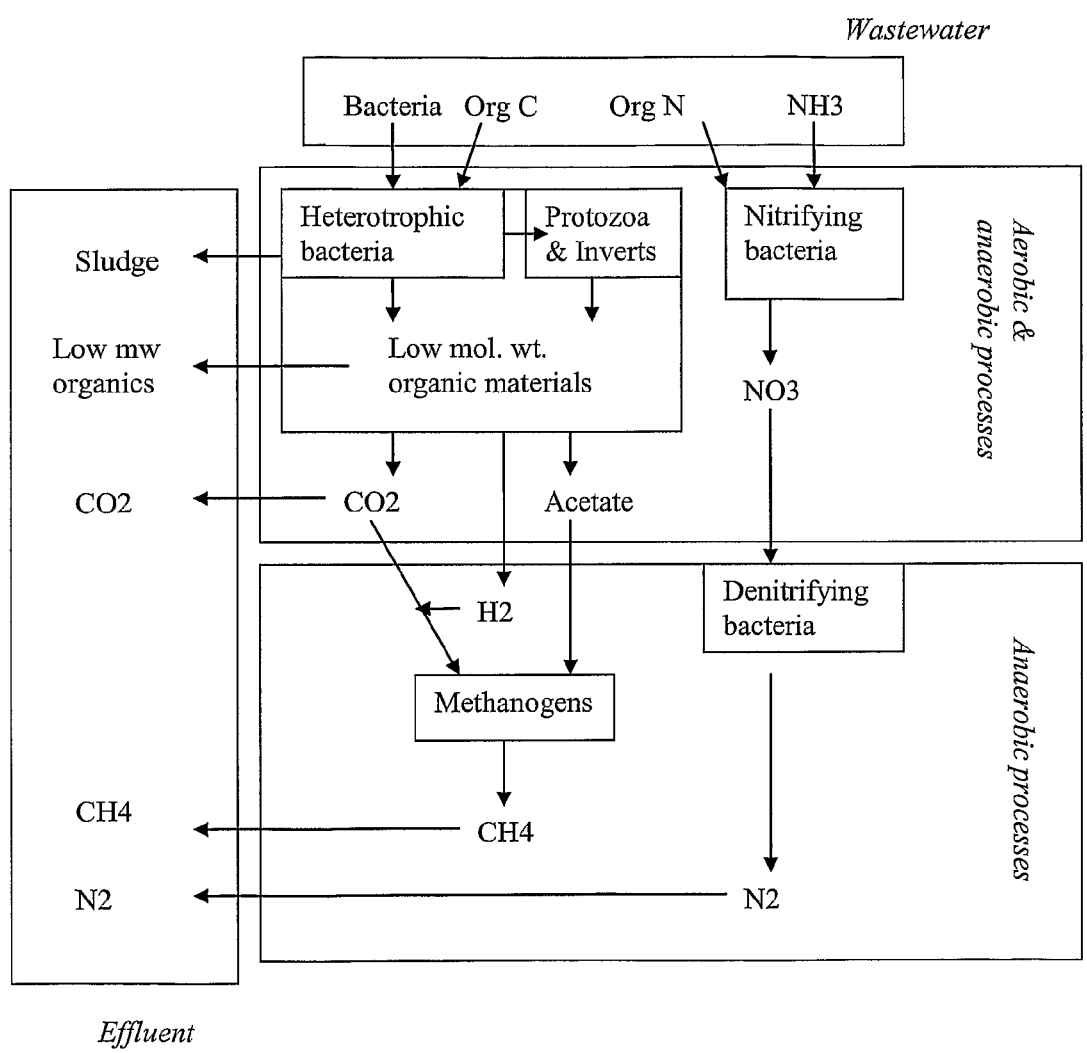
FIG. 1 shows a diagrammatic representation of the major carbon and nitrogen flows through bacterial populations in generalised wastewater treatment systems.

All the microbial processes that occur in waste-water treatment (see FIG. 1) are capable of occurring in marine environments (Kirchman (2000), see above). These processes are ubiquitous in oceanic environments, occurring in the open ocean, coastal waters, estuaries, in the water column and in sediments. The aerobic processes occur in the water column and in surface sediments of aerobic waters and the anaerobic processes occur in deeper sediments and in the anaerobic communities in salt marshes and mangrove swamps. These processes have been studied in cold environments such as the Antarctic Ocean and abyssal deep sea (2-4° C.), oceanic waters in temperate regions and in the warmer tropical regions and close to volcanic oceanic ridges. All show similar relationships between organic matter and bacterial production (Ducklow (1999) *FEMS Microbiol Ecol* 30, 1-10). For example, carbon flows in a food web constructed to be typical for oligotrophic oceans (Kirchman (2000), see above) clearly demonstrate that most dissolved and particulate organic carbon flows through bacteria (55%), protozoa (14%) and grazing invertebrates (19%).

It has been found that seawater-based, biological treatment systems are capable of treating domestic effluent effectively and that the communities of microorganisms can be kept stable, provided saltwater concentrations are kept relatively constant. In freshwater-based sewage treatment, contamination with saltwater usually hinders the process and stops effective treatment. It has now been found that the same applies in the case of freshwater contamination of saltwater-based sewage treatment.

The following examples concern two different treatment systems, one based on classical activated sludge (AS) treatment with an extended aeration period and one based on a SABR. The AS reactor was tested first, because it is known that, with freshwater-based effluents, treatment depends on establishing a mixed microbial population that settles well and that the reactor will not work without good settlement. Bulking, resulting from poor settlement, can be a common problem with such reactors and so this was a demanding first test. The SABR should in general be more robust as it is based on a fixed biofilm that establishes in the reactor. The reactors were tested at full strength seawater (at a salinity of about 35 g/l) and at 50% seawater strength (at a salinity of about 17.5 g/l). Furthermore, the full strength seawater based system was also tested at a low organic load (at a BOD of about 150 mg/l) and at high load (at a BOD of about 300 mg/l).

Methods and Materials

The AS treatment system (FIG. 2) was made using a 4 litre Perspex aeration chamber (19 cm by 19 cm by 12.5 cm) (A) which was continuously aerated and stirred. The outflow from the aeration chamber was transferred via a liquid overflow (indicated by arrow d) to a 1-litre tubular settling tank (diameter, 7 cm; height, 32 cm) (B). Following settlement, sludge was re-circulated (indicated by arrow e) to the aeration chamber using peristaltic pumps. Clean effluent was removed from the top of the settlement tank via an overflow tube (indicated by arrow c) to a capture vessel. The mixed liquor (aeration) chamber was aerated at 250 ml/min (aeration inflow indicated at b). The tank was mixed by a magnetic stirrer (100 rpm) at the bottom of the tank. The influent was delivered via a feed pipe (seawater-based sewage inflow indicated at a) from a header tank, which was filled periodically. The artificial sewage (Table 1) was made up in seawater and resulted in an average BOD in the inflow of about 150 mg/l. This represented domestic sewage in gross chemical composition. The artificial sewage used was made up in full strength seawater for the 100% seawater experiments (salinity≈35 g/l) and diluted by half with tap water for the 50% seawater experiments (salinity≈17.5 g/l). Artificial sewage was used throughout the experiments so that a constant load could be maintained throughout the period of experimentation. Double the artificial sewage concentration was used to achieve an influent BOD of about 300 mg/l. The flow rates were adjusted to achieve a residence time in the aeration tank of about 24 h and a sludge wastage rate of about 10% per day.

TABLE 1

Composition of artificial sewage

| Substance | mg/l |
|---|---|
| Oxoid nutrient broth | 120.0 |
| Dextrin | 150.0 |
| Glucose | 100.0 |
| Ammonium chloride | 130.0 |
| Potassium sulphate | 8.3 |
| Soluble starch | 100.0 |

The SABR was of similar construction (FIG. 3a) with the following major differences. The aeration chamber (C in FIG. 3a) was cylindrical, 30 litres in capacity and the bio-film was supported on tubular plastic support medium (E in FIG. 3a, and shown in detail in FIG. 3b) supplied by Aquabiotec GmbH (Hamburg, Germany), the reactor contained 11 plastic tubes (surface area=2.9 m$^2$) and the residence time in the aeration tank was 1.5 days. Sterile artificial sewage (A in FIG. 3a) at 100× the concentration given in Table 1 was mixed with seawater (concentrated artificial sewage flow in FIG. 3a indicated at b, seawater inflow indicated at a) in a 2-litre mixing vessel (B in FIG. 3a) to achieve a BOD of about 150 mg/l following a residence time in the mixing vessel of 2.4 h. The flow rates at a and b were arranged so that seawater-based artificial sewage entered the aeration chamber C at the desired strength of organic material (about 150 mg/l of BOD in these experiments). The residence time allowed bacteria to grow in the mixing vessel to simulate normal sewage. The salinity in the mixing vessel was held at about 35 g/l. Outflow from the aeration chamber (indicated at d) was transferred to a settling tank (D in FIG. 3a) and clean effluent was removed therefrom via an overflow tube (indicated at c). Note that only the artificial sewage and seawater flows (b, a) to the mixing vessel were pumped; all other flows were gravity fed.

During the operation of each system, BOD, suspended solids (SS) and salinity were recorded using standard protocols (1. HMSO. 1988, 5 day biochemical oxygen demand (BOD5), 2$^{nd}$. Ed. Her Majesty's Stationery Office, London, UK; 2. American Public Health Association, 1985, Standard methods for the examination of water and waste water, 16$^{th}$ ed. American Public Health Association, Washington, D.C., USA). Samples were measured in triplicate, results are presented as means of the replicate values. BOD was measured by the 5-day BOD protocol, which involved incubating samples in sealed, airtight bottles; oxygen concentrations were measured by the Winkler titration before and after incubation for 5 days at 20° C. BOD was expressed as $O_2$ consumed over the 5 day incubation, expressed in mg/l, in bottles in which about 50% (30-70% acceptable range) of the oxygen was consumed. The samples were diluted with oxygenated water to achieve 50% $O_2$ consumption. Total SS was measured by the dry weight of material filterable through glass fibre filters (Whatman, GF/C) from 100-200 ml of sample, the filtrate being washed with deionized water to remove dissolved materials before drying at 105° C. until constant weight. Salinity was estimated by the total dissolved solids in 5 ml aliquots of filtered sample, again dried at 105° C. until constant weight.

Pilot Plant Facility

A pilot plant facility was constructed with pilot plant scale reactors designed to treat domestic sewage from between 6-30 population equivalents (PE). Three reactors were chosen as examples of the range of small-scale, waste-treatment reactors that are used to treat domestic sewage. These reactors were supplied by commercial package treatment plant companies all proven to work well with freshwater based domestic sewage. The three reactors used were a SABR, a SBR and a RBC; these have influent rates of 1.3 m$^3$<day, 1.3 m$^3$/day and 3.0 m$^3$/day, respectively.

The pilot plant facility was located on a municipal sewage treatment plant in South Wales. It received sewage from the settled sewage line after primary settlement directly from the host sewage treatment works. High strength saline solution (≈32%) was added to the inflow so that the salt concentration of the influent could be varied in the range 0-5 g/l by varying the pumping rate. Salinity in the inflow was routinely controlled by flow adjustments based on salinity readings from an electrodeless torroidal probe. This probe was used in the pilot plant for 10 months, with the only maintenance being occasional cleaning, and proved to be very robust, reliable and fully fit for purpose. When required, high BOD inflow strength was achieved by mixing supplements such as activated sludge, primary sludge and sucrose solution (800 g/l) with the settled sewage. Settled sewage, saline solution and BOD supplement were mixed together in two mixing chambers before distribution to the three pilot plants (SABR, SBR and RBC). Accordingly, all three pilot plants received the same influent.

Normal maintenance procedures for the three pilot plants were followed which comprised mainly electrical checks and service and sludge removal when required. Flow measurements were also carried out from time to time.

Samples were taken from the inflow and pilot plant effluents twice per week. BOD and SS were measured regularly on these samples as described above. Salinity was measured on samples with a conductivity meter calibrated routinely with standard salt solutions. *Escherichia coli* and coliform counts were performed by spread plating on Chromogenic *E. coli*/coliform medium (Oxoid).

Results and Discussion

Activated Sludge Reactor

The AS reactor was operated for a period of about 6 months. The experiments were carried out to show that the reactor could produce a UK acceptable Royal Commission Standard effluent (BOD=20 mg/l; SS=30 mg/l). Once the standard had been reached the conditions were changed. Between experiments the apparatus was sometimes stripped down and re-established with a microbial inoculum from the previous experiment.

The AS reactor was operated first at a low organic load at full strength seawater. During this experiment (FIG. 4a) the inflow BOD oscillated between 120-180 mg/l (average=149 mg/l), this exemplified well the variation expected in a real treatment works. After 4 weeks of operation the plant started to reduce the BOD in the effluent and by 8 weeks the Royal Commission standard had been reached. When the AS reactor was operated at a higher BOD load the reactor performed almost identically (FIG. 4b), reaching Royal Commission standards for both BOD and SS within 8 weeks. The reactor was then maintained at high BOD and the seawater concentration in the sewage feed was reduced to about 50% (average 45.4%). The results from this operating regime (FIG. 5a) show slightly improved performance with the Royal Commission standards being reached within 7 weeks for both BOD and SS.

The standard operating parameters of the reactors also indicated good reactor performance. The activated sludge in the reactors settled well in the aeration chamber and FIG. 5b shows good sludge settlement within 30 minutes. The mixed liquor suspended solids (MLSS) concentration in the aeration chamber was stable at about 1300 mg/l throughout. The sludge volume index (SVI) was between 50-100 in these experiments indicating satisfactory performance. The SVI is the ratio of the volume of sludge that settles in a 1-litre measuring cylinder (100-ml cylinder used here) in 30 minutes (V) and the MLSS (SVI=V×1000 (ml g$^{-1}$)/MLSS (mg l$^{-1}$)). A good sludge should have an SVI<80 and a very good sludge around 50; whilst an SVI>120 indicates poor settling properties. The microbial composition of the sludge was also as expected for a plant working well (FIG. 6). The sludge flocs were well separated when viewed microscopically (FIG. 6a) and the numbers of protozoa (FIG. 6b-e) were typical for a stable plant (FIG. 6, Table). In addition the apparent species composition of protozoa was typical for a plant producing good effluent (e.g. 1. Curds, C. R., & Cockburn, A., 1970. Water Res. 4, 225-236; 2. Curds, C. R. & Cockburn, A., 1970. Water Res. 4, 237-249). The table in FIG. 6 illustrates the numbers of protozoa (per ml) found in the AS reactor. Keeping the salinity stable during the separate experiments helped stabilise the microbial populations. However, the putative identifications of the protozoa cannot be confirmed because the counts were based on gross morphological features only and halophilic subspecies *might* not have been apparent. Despite this, stalked and crawling ciliates were abundant, which are the correct types expected for good effluent purification. In FIG. 6a, a low power photomicrograph of sludge flocs with a *Vorticella convallaria* attached to one floc can be seen. The other photomicrographs in FIG. 6 show (b) a crawling ciliate, *Chilodonella unicata* (c), the crawling ciliate, *Euplotes affinis*, behind a detritus particle (d), the colonial stalked ciliate, *Epistylis chiysemydis* and (e) the stalked ciliate *Vorticella convallaria*.

Value of Stable Salinity

During the experiments there were clear indications that rapidly changing salt concentrations affected the effluent treatment adversely. FIG. 7 shows how BOD values increased rapidly as unexpected, evaporative concentration of the saline artificial sewage occurred when the plant salinity increased to 45 g/l in the aeration tank. This stopped the microbial population working well; note a BOD of 67 mg/l in week 3 when the salinity first starts to rise. This meant that the oxidation of the artificial sewage did not occur during the next 4 weeks. However, prompt action in reducing the salinity (see week 6 value in FIG. 7) helped re-establish a strong microbial flora which resulted in good treatment after week 8 in FIG. 7 (data not shown). This indicated the importance of controlling salinity in these seawater based treatment systems and probably explains how the plant run at 50% seawater salinity produced good effluent more quickly (FIG. 5a) than in the 100% seawater experiment (FIG. 4a).

Submerged Aerated Biofilm Reactor

This reactor has a mixing vessel in which bacteria grow to simulate the composition of real sewage before the feed into the aerated reactor (FIG. 3a).

This means that the BOD and SS concentrations in the influent to the reaction chamber were not as stable as in the AS reactor described above. This is not a problem because, in reality, sewage strength can vary suddenly and this feature therefore allows a more close approximation of a real sewage treatment plant. The first experiment followed the initial setting up of the reactor and so the results presented (FIG. 8) show establishment after a rather variable operational period. Despite these problems, it can be seen that BOD reached Royal commission standards by the fourth week of operation (FIG. 8a), whilst SS fluctuated around the required standard of 30 mg/l (FIG. 8b). The biofilm was then removed from the plastic tubular supports by scrubbing but the media were not sterilised. Washing was also used to clean the other vessels and tubing. This meant that when the reactor was restarted it received a small inoculum from the remaining microbes on the surfaces. This is in reality similar to using a small inoculum to start up a new treatment system. The results show (FIG. 9) very rapid and effective treatment, Royal Commission standards were achieved for both BOD and SS within two weeks. It is noteworthy that this system produced very stable effluents despite great fluctuations in the inflow suspended solids. The high value in week 2 of the second experiment (FIG. 9b) was due to blockage of the outflow from the mixing vessel that stopped the feed to the aeration tank and allowed large numbers of microbes to grow in the mixing chamber. Despite this, the SABR effluent quality did not deteriorate. This shows that the SABR is likely to be a superb system for treating seawater-based effluents.

A long term experiment was conducted in the laboratory-scale, 30 litre SABR to investigate the ability of seawater-based, sewage-treatment reactors to effectively treat sewage at the equivalent of 100%, 50% and 25% seawater concentrations (namely approximately 35, 17.5 and 8.75 mg/l salt). The results show (FIG. 12) that treatment was very effective, reducing the BOD concentration from on average 158 mg/l to 13 mg/l (i.e. 92% BOD reduction). There was little noticeable change in the effluent BOD concentration, and the treatment system was robust, provided that salinity was maintained within reasonable limits (i.e. target ±5 mg/l).

Pilot Plant Facility

The pilot plant facility was operated for 10 months.

FIG. 13 shows the results for all three reactors over a 15 week period in summer and autumn with low BOD inflow. This shows that BOD was effectively reduced to within acceptable standards for all three types of pilot plant. These results were obtained shortly after start-up of the pilot plant facility so some plants needed time to establish sufficient microbial biomass in the reactors to treat the effluent effectively. The SABR performed well from the beginning producing low BOD and SS (FIG. 14). This showed that the pilot plant established its active biomass very quickly in a similar manner to the laboratory scale plant, supporting the applicability of laboratory scale results (e.g. FIG. 12) to full scale plants. The RBC was the next quickest to establish and by mid August was producing high quality effluent with low BOD and SS. As expected the SBR took the longest to establish its biomass at such a low effluent strength; it is well known that SBR reactors need higher influent strength than SABR or RBC reactors to establish quickly. Despite this, by mid-September effluents consistently below required standards were being produced (FIG. 13) in the SBR. A summary of these initial results is provided (FIG. 15); the results show effluent quality meeting both UK and European standards for BOD for all reactors and for SS for the RBC and SABR. The slightly higher value for the SS from the SBR is because it took longer than the others to establish an effective microbial biomass.

The effluent salinity in all three treatment plants tracked influent salinity consistently, so the effluent salinities for the RBC are given here as an example; results from the other plants were very similar. The salinity was varied for short periods of time during this part of the pilot plant trials (see FIG. 13a). The results (FIG. 13) show that effluent quality in all the reactors was relatively stable over this short 15 week period. These results indicate that the reactors are relatively resistant to the short term changes which will inevitably occur during normal use and are capable of recovering their efficiency, at least in part. Changes in salt concentration can be seen, however, to lead to temporary losses of efficiency. Sustained periods of variable salt concentration are therefore expected to have a significant detrimental impact on efficiency. Accordingly, longer term stability is required for a practical treatment approach (FIG. 12).

A trial at the pilot plant facility was carried out with the influent BOD increased by the addition of sucrose on 24 Feb. 2005 (i.e. the first two points on FIG. 16c are with low BOD and the rest are with high BOD). The example results given (FIG. 16) show that the RBC produced high quality effluent throughout and that after a period of stabilisation the SBR was also producing high quality effluent by late February. The salinity was relatively stable during this period at the equivalent of 100% seawater concentration (variation range 2-4% salt).

Indicators of Pathogens

*E. coli* and coliforms are commonly used as indicators of pathogens in drinking and recreational waters. For this reason it is important that wastewaters from any sewage process show a significant reduction in levels of these two groups of indicator bacteria. Percentage reductions of 95-99% are achievable in effective freshwater-based, wastewater treatment plants.

The investigation of the effectiveness of seawater based wastewater treatment plants in reducing these indicator bacteria was assessed in two ways. A pulse-chase experiment was carried out in which a pulse of *E. coli* was added to the laboratory SABR operating with close to 100% seawater equivalent saline influent (see FIG. 16a). The laboratory SABR was used for this experiment because it used a totally artificial sewage as influent and so both *E. coli* and coliform counts in the influent and effluent were always zero whenever tested. This allowed a pulse of *E. coli* to be followed effectively, which would not have been possible with real sewage as influent. The results in FIG. 17a show that the pulse of *E. coli* was effective in the influent and that no more *E. coli* were discharged from the reactor 24 h after the pulse ended. This is less than one replacement time. This clearly shows that the introduced *E. coli* were effectively killed. Furthermore, the area under the two curves indicates the total number of *E. coli* added and recovered in the effluent, calculations show that only 88% of the *E. coli* added was recovered, which again demonstrates the active killing of the indicators during treatment. FIG. 17b shows how coliforms and *E. coli* were killed during effective treatment in the SBR. In the early part of the graph (before 24 Feb. 2005) treatment was not consistently effective, as the plant adapted to the high strength inflow (FIG. 16b). However, on 28 Feb. 2005 and thereafter, BOD removal was effective (FIG. 16b) and both coliform and *E. coli* reduction was >95% (FIG. 17b), and so equivalent to figures achieved in good freshwater-based plants.

Controlling Salinity in Saltwater-Based Wastewater Treatment

One suitable method for controlling salinity is shown diagrammatically in FIG. 10 and is described as follows. Salinity can best be monitored and controlled via conductivity estimates obtained by continuous monitoring with a torroidal conductivity probe (A in FIG. 10), with built-in temperature compensation, linked to an appropriate controller (B in FIG. 10). The torroidal probe is electrodeless and works by inducing and sensing alternating current in the surrounding liquid. This type of probe is ideal for this wastewater application for the following two main reasons: (i) Torroidal probes will measure conductivity over a wide range of salinity; (ii) The probe's performance is not affected by minor fouling with microbial biofilm (although some routine cleaning is required to prevent gross fouling). These probes are also insensitive to the length of the lead used between probe and controller. The conductivity may be measured in a mixing chamber (C in FIG. 10) into which is flowed saltwater-based wastewater (a in FIG. 10) and compensating water of high (b in FIG. 10) and/or low (c in FIG. 10) salinity. The controller then senses the conductivity and adjusts the flow of compensation waters appropriately to adjust salinity in the mixing tank to the desired level. Flow control is achieved by the controller by the actuation of valves or other appropriate flow regulating devices (D in FIG. 10). This allows the achievement of stable salinity in the outflow to the mixing vessel (d in FIG. 10), this outflow being the wastewater inflow to the aerobic treatment tank.

The invention claimed is:

1. Apparatus for biological treatment of saltwater-based domestic wastewater, the apparatus having an inlet for the introduction of the saltwater-based domestic wastewater, an outlet for the removal of treated wastewater, means for monitoring the salinity level of the saltwater-based domestic wastewater entering or within the apparatus and means for controlling the salinity level of the saltwater-based domestic wastewater entering or within the apparatus such that fluctuations in the salinity level of the saltwater-based domestic wastewater are reduced and the biological treatment of the saltwater-based domestic wastewater is thereby maintained, the apparatus being suitable for the maintenance of a marine biological community and the biological treatment being aerobic with aeration using air.

2. Apparatus according to claim 1 wherein the means for controlling the salinity level of the saltwater-based domestic wastewater within the apparatus is capable of reducing fluctuations in salinity level to within 50% of the desired salinity level.

3. Apparatus according to claim 2 wherein the means for controlling the salinity level of the saltwater-based domestic wastewater within the apparatus is capable of reducing fluctuations in the salinity level to within 25% of the desired salinity level.

4. Apparatus according claim 1 wherein the means for controlling the salinity level of the saltwater-based domestic wastewater within the apparatus comprises a supplementary saltwater feed, by which the contents of the apparatus may be maintained at a substantially constant overall volume.

5. Apparatus according to claim 1 having a further inlet for the introduction of domestic wastewater based on freshwater and a component for the mixing of the freshwater-based wastewater and/or the saltwater-based wastewater with salt, saltwater, a concentrated saline solution, a dilute saline solution or freshwater, prior to or on introduction of the freshwater-based wastewater.

6. Apparatus according to claim 1 wherein the means for controlling the salinity level of the saltwater-based domestic wastewater comprises a device for the supply of salt, concentrated saline solution, saltwater, dilute saline solution or freshwater.

7. Apparatus according to claim 6 including an evaporator for the production of the salt or concentrated saline solution from saltwater originating from the same source as that on which the saltwater-based domestic wastewater is based.

8. Apparatus according to claim 7 wherein the evaporator is solar powered.

9. Apparatus according to claim 1 wherein those parts of the apparatus which come into contact with saltwater-based domestic wastewater during normal use are formed from materials substantially resistant to salt and/or water corrosion.

10. Apparatus according to claim 1 wherein the saltwater is seawater.

11. Apparatus according to claim 1 which works on the principle of a submerged, aerated biofilm reactor, an activated sludge reactor, a sequencing batch reactor, a rotating biological contactor or a membrane bioreactor.

12. Apparatus according to claim 1 provided with a marine biological culture.

13. Apparatus according to claim 1 wherein the means for monitoring the salinity level comprises a device for measurement of conductivity.

14. A domestic water supply and sewerage assembly comprising: a first supply conduit for the supply of saltwater to at least one toilet and a corresponding first sewerage conduit for removal of saltwater-based wastewater from the at least one toilet; and a second supply conduit for the supply of freshwater to one or more devices requiring potable water and a corresponding second sewerage conduit for removal of freshwater-based wastewater from those devices, the first and second sewerage conduits being arranged so as to allow the transfer of the saltwater-based wastewater for biological treatment without the salinity level of the saltwater-based wastewater being affected by uncontrolled mixing with the freshwater-based wastewater to such a degree as to significantly affect the biological treatment.

15. An assembly according to claim 14 wherein the first sewerage conduit is arranged for the transfer of the saltwater-based domestic wastewater to an apparatus for biological treatment of saltwater-based domestic wastewater, the apparatus having an inlet for the introduction of the saltwater-based domestic wastewater, an outlet for the removal of treated wastewater, means for monitoring the salinity level of the saltwater-based domestic wastewater entering or within the apparatus and means for controlling the salinity level of the saltwater-based domestic wastewater entering or within the apparatus such that fluctuations in the salinity level of the saltwater-based domestic wastewater are reduced and the biological treatment of the saltwater-based domestic wastewater is thereby maintained, the apparatus being suitable for the maintenance of a marine biological community and the biological treatment being aerobic with aeration using air.

16. An assembly according to claim 14 wherein the second sewerage conduit is arranged so as to allow the transfer of the freshwater-based domestic wastewater to a separate location to that of the treatment of the saltwater-based domestic wastewater.

17. An assembly according to claim 14 wherein the second sewerage conduit is arranged so as to allow the transfer of the freshwater-based wastewater to the same location as that of the treatment of the saltwater-based wastewater the freshwater-based and saltwater-based wastewaters being mixed at or before reaching the location of biological treatment, and the first and/or second sewerage conduit, or a third common conduit carrying mixed wastewater, communicating, in use, with a supply of salt, saltwater, concentrated saline solution, a dilute saline solution or freshwater, so as to increase or decrease the salinity of the resulting mixed wastewater.

18. An assembly according to claim 14 wherein the saltwater is seawater.

19. A method for the biological treatment of domestic wastewater, the wastewater comprising a stream of saltwater-based domestic wastewater from at least one toilet supplied with saltwater and a stream of freshwater-based domestic wastewater from at least one device supplied with freshwater, the method comprising transferring the stream of saltwater-based wastewater for biological treatment in such a manner as to avoid the salinity level of the saltwater-based wastewater being affected by uncontrolled mixing with the stream of freshwater-based wastewater to such a degree as to significantly affect the biological treatment, and biologically treating the resulting saltwater-based or mixed wastewater.

20. A method according to claim 19 wherein the stream of saltwater-based wastewater is transferred, for biological treatment, to a separate location to the stream of freshwater-based wastewater.

21. A method according to claim 19 wherein the stream of freshwater-based wastewater is mixed with the stream of saltwater-based wastewater, salt, saltwater, a concentrated saline solution, a dilute saline solution or freshwater being added to the stream of freshwater-based wastewater and/or the stream of saltwater-based wastewater prior to or during the mixing, or being added to the mixed wastewater following mixing, so as to increase or decrease the salinity of the resulting mixed wastewater, prior to biological treatment.

22. A method according to claim 21 wherein the amount of salt, saltwater, concentrated saline solution, dilute saline solution or freshwater mixed with the freshwater-based wastewater and/or the saltwater-based wastewater, and the amount of the resulting mixture mixed with the saltwater-based wastewater or the freshwater-based wastewater, respectively, is such as to provide a salinity level in the resulting biological treatment mixture of 25 to 150% of the salinity level in the stream of saltwater-based wastewater.

23. A method according to any of claim 19 wherein, during biological treatment of the saltwater-based or mixed wastewater, a supplementary feed of saltwater is provided to maintain the wastewater undergoing treatment at a substantially constant overall volume.

24. A method according to claim 19 wherein the salinity of the wastewater prior toundergoing and/or following treatment is monitored.

25. A method according to claim 19 wherein the salinity of the wastewater undergoing treatment is maintained at a relatively constant level by means of the addition of salt or a concentrated saline solution to increase the salinity, or a dilute: saline solution or freshwater to decrease the salinity, or further saltwater to alter the salinity towards the level of the saltwater-based wastewater.

26. A method according to claim 25 wherein the salt or concentrated saline solution is obtained by the partial or complete evaporation of saltwater originating from the same source as that on which the saltwater-based wastewater is based.

27. A method according to claim 26 wherein the evaporation step is solar powered.

28. A method according to claim 19 wherein the saltwater is seawater.

29. A method according to claim 19 wherein the biological treatment is aerobic biological treatment performed using a submerged aerated biofilm reactor, a sequencing batch reactor, a rotating biological contactor or a membrane bioreactor.

30. A method according to claim 19 wherein the biological treatment is performed using a marine biological culture based on bacteria, protozoa and/or invertebrates.

31. A method according to claim 30 wherein the bacteria are selected from single celled and filamentous heterotrophic bacteria and autotrophic nitrifying bacteria.

32. A method according to claim 30 wherein the protozoa are selected from grazing protozoa, such as ciliated stalked and crawling types.

33. A method according to claim 30 wherein the invertebrates are selected from grazing invertebrates feeding on microorganisms and organic matter, such as meiofauna.

34. A method according to claim 19 wherein the biological treatment involves the additional step of the addition of nutrients in order to generate a biological community prior to the introduction of wastewater.

35. A method according to claim 34 wherein the nutrients are in the form of a solution of organic materials.

36. A method according to claim 34 wherein the generation of the biological community takes place at a salinity level substantially the same as that intended to be used for the biological treatment of the saltwater-based wastewater.

37. A method for biological treatment of saltwater-based domestic wastewater by means of a marine biological community, the method comprising introducing the saltwater-based domestic wastewater into an apparatus suitable for the development and/or maintenance of a marine biological treatment community and controlling the salinity level of the wastewater within the apparatus such that fluctuations in salinity level are reduced and the biological treatment of the wastewater is thereby maintained.

* * * * *